(12) United States Patent
Diebel et al.

(10) Patent No.: US 11,949,306 B2
(45) Date of Patent: Apr. 2, 2024

(54) FRACTIONAL-SLOT-WINDING MOTORS AND ELECTRICAL VEHICLES COMPRISING THEREOF

(71) Applicant: Harbinger Motors Inc., Gardena, CA (US)

(72) Inventors: Jackson George Diebel, Hermosa Beach, CA (US); Alex Tylee, Gardena, CA (US); James Dameron, Gardena, CA (US); Phillip John Weicker, Hermosa Beach, CA (US)

(73) Assignee: Harbinger Motors Inc., Gardena, CA (US)

( * ) Notice: Subject to any disclaimer, the term of this patent is extended or adjusted under 35 U.S.C. 154(b) by 0 days.

(21) Appl. No.: 18/462,219

(22) Filed: Sep. 6, 2023

(65) Prior Publication Data

US 2024/0079924 A1  Mar. 7, 2024

Related U.S. Application Data

(60) Provisional application No. 63/374,714, filed on Sep. 6, 2022.

(51) Int. Cl.
*H02K 3/50* (2006.01)
*H02K 1/20* (2006.01)
(Continued)

(52) U.S. Cl.
CPC .................. *H02K 3/50* (2013.01); *H02K 1/20* (2013.01); *H02K 3/14* (2013.01); *H02K 3/24* (2013.01); *B60K 1/00* (2013.01); *H02K 2203/09* (2013.01)

(58) Field of Classification Search
CPC .. H02K 1/20; H02K 3/12; H02K 3/14; H02K 3/28; H02K 2203/09
See application file for complete search history.

(56) References Cited

U.S. PATENT DOCUMENTS 8,294,324 B2  10/2012  Ishigami et al.
8,698,368 B2   4/2014  Huppunen et al.
(Continued)

FOREIGN PATENT DOCUMENTS

EP  2110931 A2  10/2009
JP  2013042588 A   2/2013
WO  2020262375 A1  12/2020

OTHER PUBLICATIONS

International Application Serial No. PCT/US23/73567, Search Report and Written Opinion mailed Dec. 27, 2023, 9 pgs.

*Primary Examiner* — Daniel C Puentes
*Assistant Examiner* — Minki Chang
(74) *Attorney, Agent, or Firm* — Polygon IP, LLP

(57) ABSTRACT

Described herein are fractional-slot-winding motors and electric vehicles using such fractional-slot-winding motors. In some examples, a fractional-slot-winding motor comprises a stator, a bus-bar assembly, and a plurality of coil units. The stator comprises a plurality of stator slots (e.g., 63 slots) extending through the core and radially offset relative to each other. Each dual-leg coil unit extends through two different stator slots and is electrically coupled to two other coil units on the coil-interconnection side of the rotor. Each single-leg coil unit extends through one coil slot and is electrically coupled to one other coil unit on the coil-interconnection side. At least some single-leg coil units can be coupled to a bus-bar assembly. Furthermore, the ends of the coil unit can have radial offsets relative to protruding portions, e.g., closer to the motor primary axis at the coil-interconnection side and further away on the opposite side.

20 Claims, 16 Drawing Sheets

(51) Int. Cl.
*H02K 3/14* (2006.01)
*H02K 3/24* (2006.01)
*B60K 1/00* (2006.01)

(56) References Cited

U.S. PATENT DOCUMENTS

| | | |
|---|---|---|
| 9,126,581 B2 | 9/2015 | Swales et al. |
| 9,209,657 B2 | 12/2015 | Huppunen et al. |
| 9,698,644 B2 | 7/2017 | Fukasaku et al. |
| 9,707,956 B2 | 7/2017 | Swales et al. |
| 9,923,438 B2 | 3/2018 | Ito et al. |
| 11,482,910 B2 | 10/2022 | Finger-Albert et al. |
| 2010/0019589 A1 | 1/2010 | Saban et al. |
| 2010/0019590 A1 | 1/2010 | Guedes-Pinto et al. |
| 2013/0015020 A1 | 1/2013 | Huppunen et al. |
| 2014/0076668 A1 | 3/2014 | Huppunen et al. |
| 2014/0335995 A1 | 11/2014 | Swales et al. |
| 2015/0249373 A1 | 9/2015 | Fukasaku et al. |
| 2015/0336573 A1 | 11/2015 | Swales et al. |
| 2016/0020658 A1* | 1/2016 | Tamura .............. H02K 3/28 310/71 |
| 2016/0056696 A1 | 2/2016 | Ito et al. |
| 2017/0282909 A1 | 10/2017 | Swales et al. |
| 2018/0367003 A1* | 12/2018 | Rippel ............... H02K 1/20 |
| 2020/0076277 A1 | 3/2020 | Finger-Albert et al. |
| 2021/0066984 A1 | 3/2021 | Hunstable et al. |
| 2021/0067016 A1 | 3/2021 | Hunstable et al. |
| 2021/0091612 A1 | 3/2021 | Dameron et al. |
| 2021/0194307 A1* | 6/2021 | Dotz ................. H02K 3/38 |
| 2021/0273513 A1* | 9/2021 | Siddiqui ............ H02K 5/225 |
| 2021/0288545 A1 | 9/2021 | Dameron et al. |
| 2021/0376680 A1 | 12/2021 | Yang et al. |
| 2022/0045559 A1 | 2/2022 | Hunstable et al. |
| 2022/0069681 A1 | 3/2022 | Steenburg et al. |
| 2022/0103038 A1 | 3/2022 | Makhlouki et al. |
| 2022/0209591 A1 | 6/2022 | Pang et al. |
| 2023/0026208 A1 | 1/2023 | Kamegawa |

\* cited by examiner

First-type-dual-leg coil unit / Layer-jump coil unit (hairpin)

Second-type-dual-leg coil unit / Plus-one-type-one coil unit (hairpin)

Third-type-dual-leg coil unit / Plus-one-type-two coil unit (hairpin)
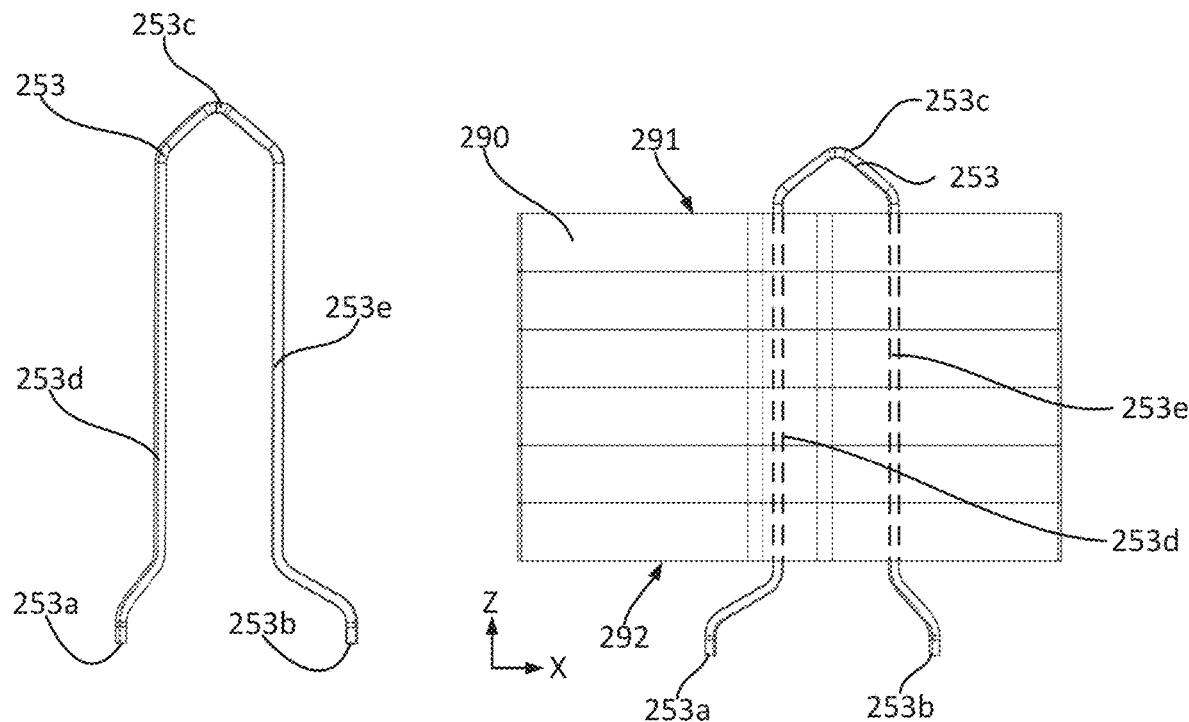
FIG. 7A
FIG. 7B
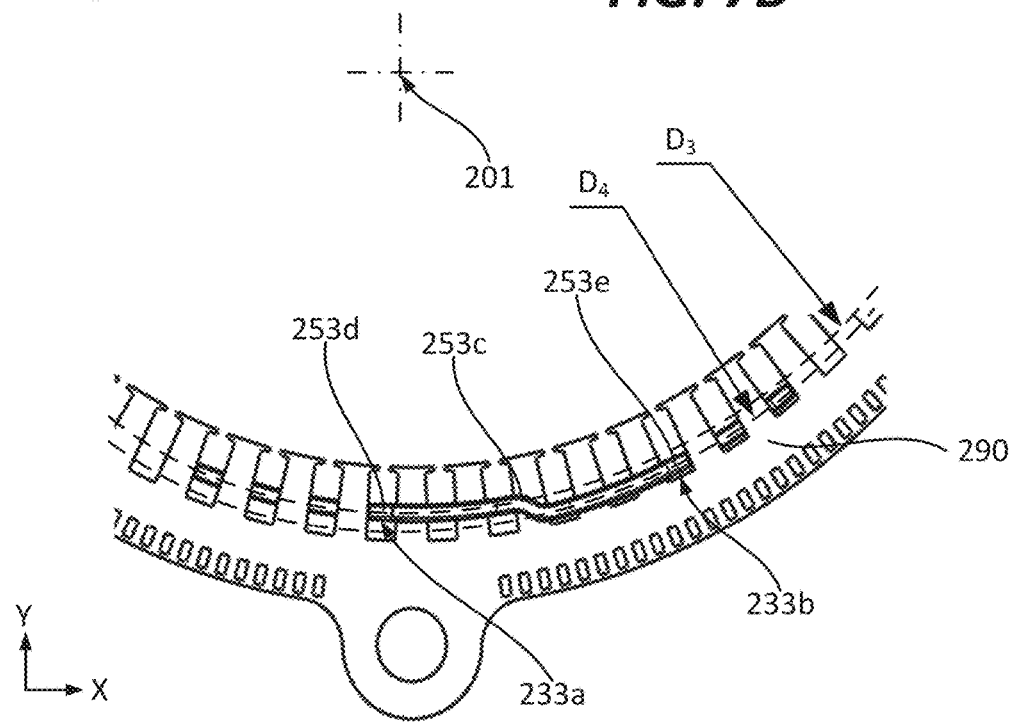
FIG. 7C

Fourth-type-dual-leg coil unit / Standard-type-one coil unit (hairpin)

Fifth-type-dual-leg coil unit / Standard-type-two coil unit (hairpin)

Sixth-type-dual-leg coil unit / Looped-type-one coil unit (hairpin)
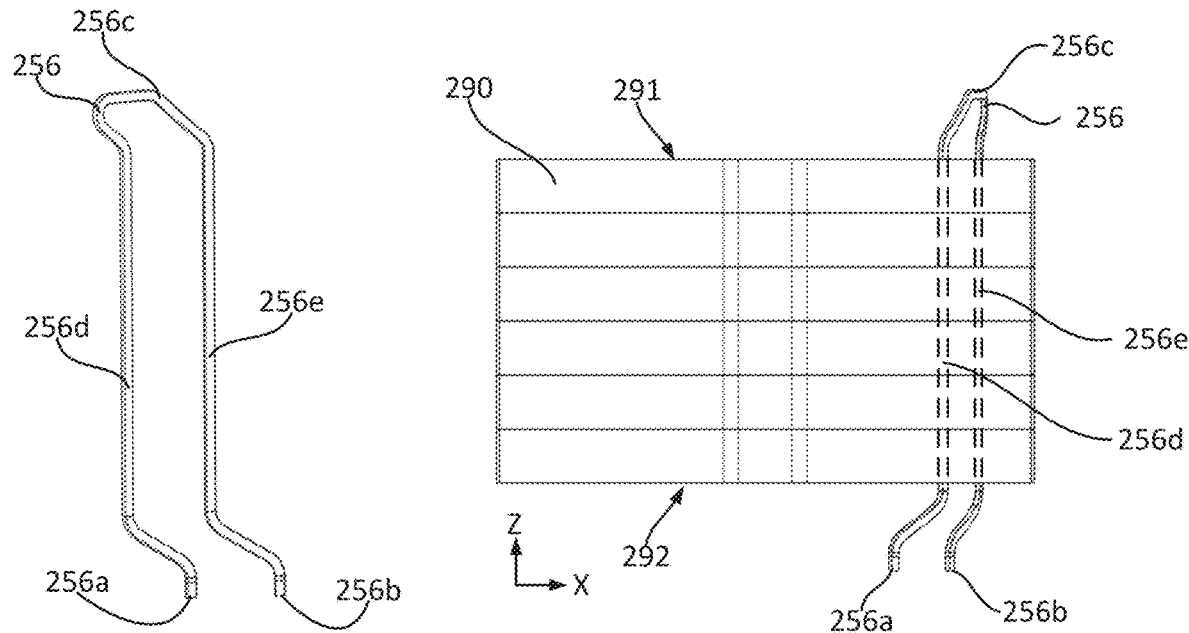
FIG. 10A
FIG. 10B
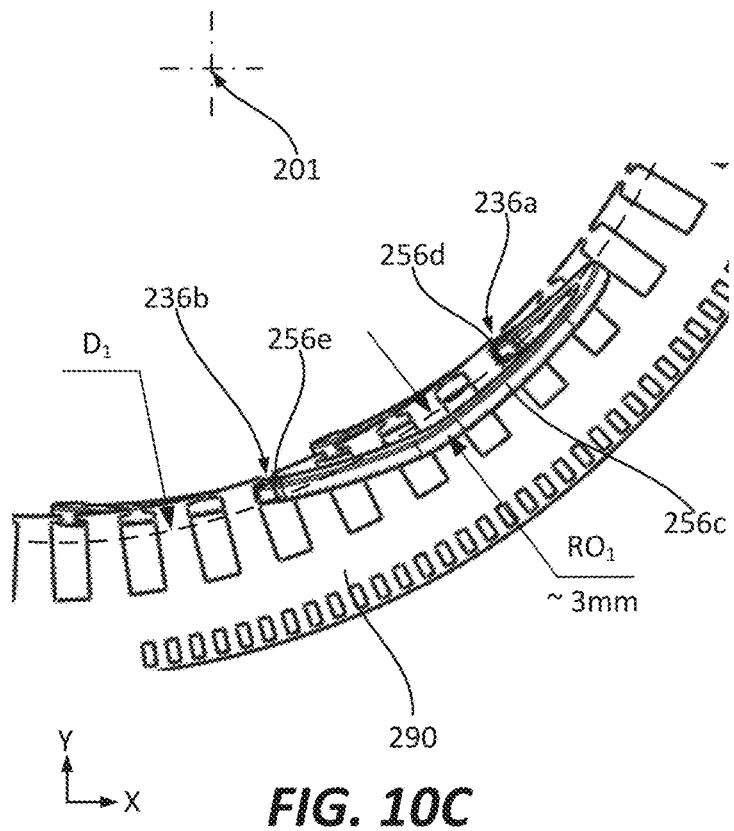
FIG. 10C

Seventh-type-dual-leg coil unit / Looped-type-two coil unit (hairpin)

First-type-single-leg coil unit / Extended-type-one coil unit (hairpin)
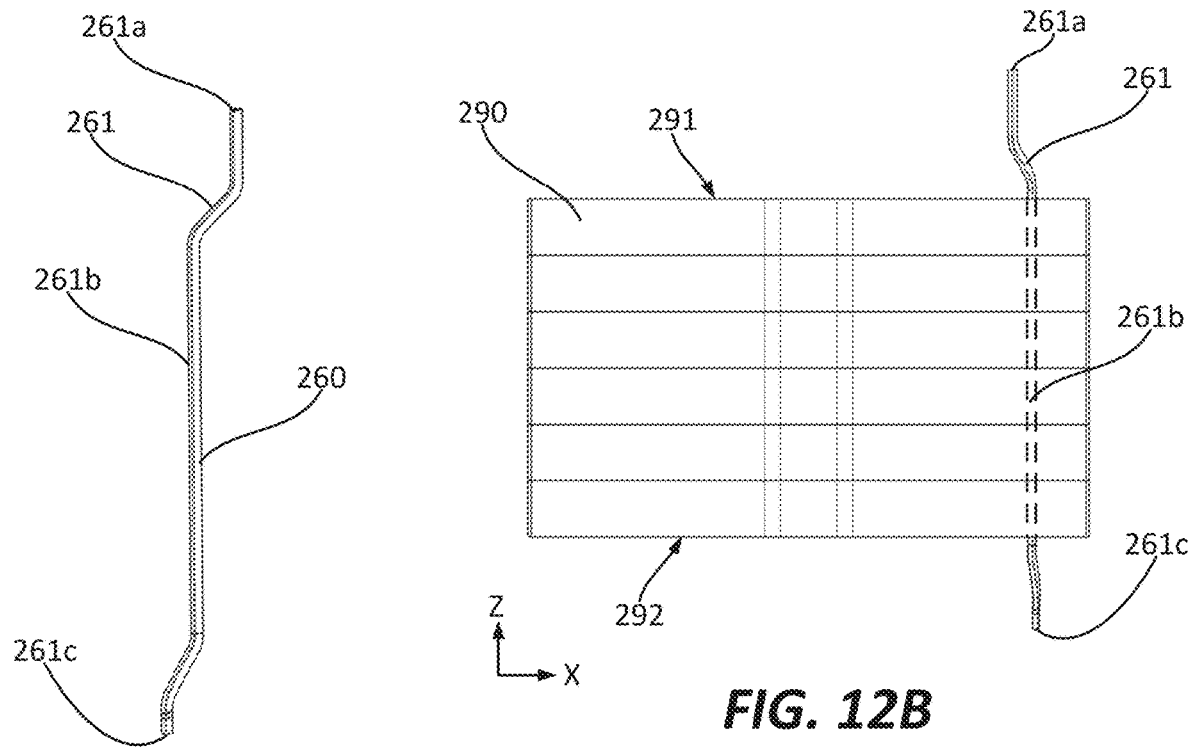
FIG. 12A
FIG. 12B
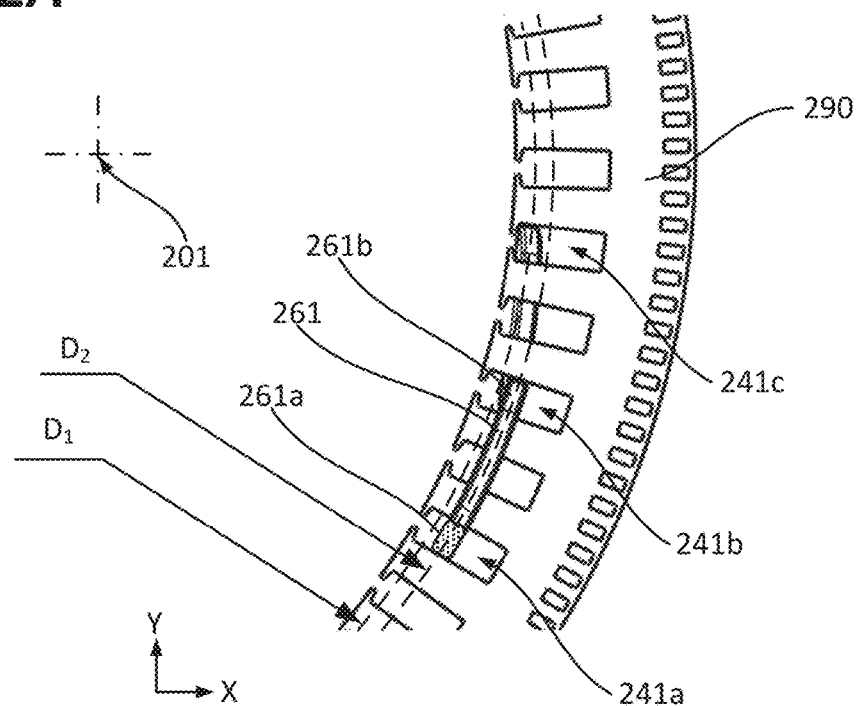
FIG. 12C Second-type-single-leg coil unit / Extended-type-two coil unit (hairpin)
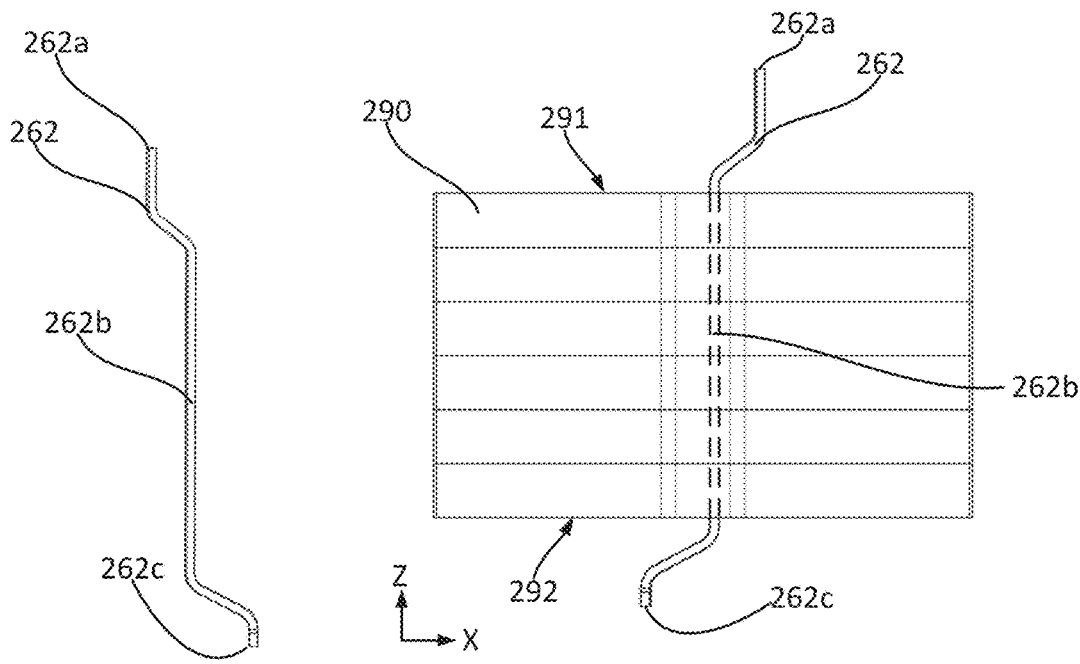
FIG. 13A
FIG. 13B
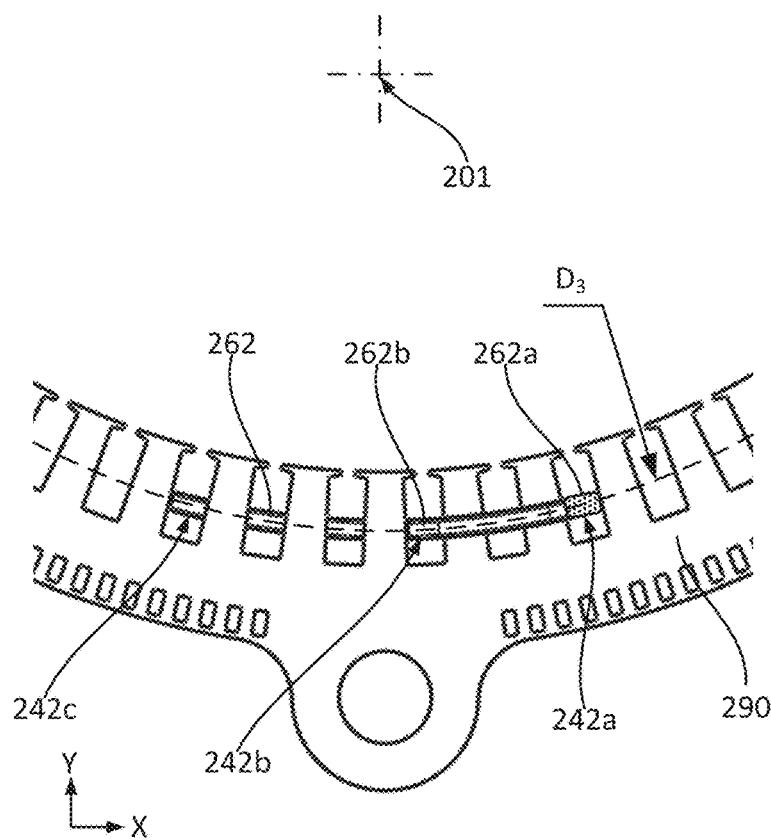
FIG. 13C

FRACTIONAL-SLOT-WINDING MOTORS AND ELECTRICAL VEHICLES COMPRISING THEREOF

CROSS-REFERENCE TO RELATED APPLICATIONS

This application claims the benefit under 35 U.S.C. § 119(e) of U.S. Provisional Patent Application 63/374,714, filed on 2022 Sep. 6, which is incorporated herein by reference in its entirety for all purposes.

BACKGROUND

Electric motors are used in electric vehicles and other applications to produce mechanical energy from electrical energy. An electric motor can include a rotor rotating within a stator such that both components generate respective magnetic fields causing the rotation. A stator can include a coil (e.g., a wire) protruding through the stator and forming windings through the stator. An electric current is passed through the coil to generate magnetic fields. In some electric motors, multi-phase electric currents are used. A specific example of such electric motors is fractional-slot-winding motors, in which the conductors carrying the same phase occupy a fractional number of slots. However, conventional fractional-slot-winding motors are hard to manufacture and tend to have large offsets on each side of the stator, which can be referred to as winding extensions. Because of these winding complexities and offsets, fractional-slot-winding motors can be bulky, which negatively impacts the torque density. Furthermore, conventional fractional-slot-winding motors tend to have many unique components (to form these complex windings), which makes these motors difficult to fabricate and expensive.

What is needed are new fractional-slot-winding motors with increased torque densities and fewer unique components.

SUMMARY

Described herein are fractional-slot-winding motors and electric vehicles using such fractional-slot-winding motors. In some examples, a fractional-slot-winding motor comprises a stator, a bus-bar assembly, and a plurality of coil units. The stator comprises a plurality of stator slots (e.g., 63 slots) extending through the core and radially offset relative to each other. Each dual-leg coil unit extends through two different stator slots and is electrically coupled to two other coil units on the coil-interconnection side of the rotor. Each single-leg coil unit extends through one coil slot and is electrically coupled to one other coil unit on the coil-interconnection side. At least some single-leg coil units can be coupled to a bus-bar assembly.

In more specific examples, all single-leg coil units are only connected (e.g., welded) to the bus-bar assembly on the bus-bar side. In other words, there are no coil-coil connections (e.g., welds) at all on the bus-bar side. It should be noted that dual-leg coil units only make connections on the coil-interconnection side. With that, all coil-coil connections in the fractional-slot-winding motor are formed on the coil-interconnection side. Since the bus-bar assembly has six connections (one connection to each of the three phase-type bus bars and three connections to the neutral bus bar), the fractional-slot-winding motor can have only six welded connections on the bus-bar side, i.e., between the bus bars and the single-leg coil units. This approach (no coil-coil connections and only 6 coil-bus bar connections on the bus-bar side) significantly simplifies the design and construction of the fractional-slot-winding motor.

Furthermore, the ends of the coil unit can have radial offsets relative to protruding portions, e.g., closer to the motor primary axis at the coil-interconnection side and further away on the opposite side.

These and other embodiments are described further below with reference to the figures.

CLAUSES

Clause 1. A fractional-slot-winding motor 200 having a primary axis 201, the fractional-slot-winding motor 200 comprising: a stator 290, comprising a coil-interconnection side 291 and a bus-bar side 292, wherein the stator 290 comprises: a plurality of stator slots 299 extending through the stator 290 parallel to the primary axis 201 between the coil-interconnection side 291 and the bus-bar side 292 and circumferentially offset from each other, and a plurality of fluid-passage slots 293 extending through the stator 290 between the coil-interconnection side 291 and the bus-bar side 292 and circumferentially offset from each other, and the plurality of fluid-passage slots 293 is configured to provide a fluid flow between the coil-interconnection side 291 and the bus-bar side 292; a bus-bar assembly 270, comprising a first bus bar 271, a second bus bar 272, and a third bus bar 273, adjacent to the bus-bar side 292 of the stator 290; and a plurality of coil units 280, each extending through the stator 290, wherein: each of the plurality of coil units 280 is electrically coupled to at least one other of the plurality of coil units 280 at the coil-interconnection side 291, a first one of the plurality of coil units 280 is electrically coupled to the first bus bar 271, a second one of the plurality of coil units 280 is electrically coupled to the second bus bar 272, and a third one of the plurality of coil units 280 is electrically coupled to the third bus bar 273.

Clause 2. The fractional-slot-winding motor 200 of clause 1, wherein the bus-bar assembly 270 further comprises a neutral busbar 274, electrically coupled to three of the plurality of coil units 280.

Clause 3. The fractional-slot-winding motor 200 of clause 1, wherein the bus-bar assembly 270 has a circumferential span of less than 90 degrees.

Clause 4. The fractional-slot-winding motor 200 of clause 1, wherein four different ones of the plurality of coil units 280 protrude through each of the plurality of stator slots 299.

Clause 5. The fractional-slot-winding motor 200 of clause 1, wherein the plurality of stator slots 299 comprises 63 stator slots.

Clause 6. The fractional-slot-winding motor 200 of clause 5, wherein the plurality of coil units 280 form 14 electric poles in the fractional-slot-winding motor 200.

Clause 7. The fractional-slot-winding motor 200 of clause 1, wherein the plurality of stator slots 299 and the plurality of coil units 280 are arranged into a 1.5-slots per pole per phase configuration.

Clause 8. The fractional-slot-winding motor 200 of clause 1, wherein the plurality of stator slots 299 and the plurality of coil units 280 are arranged to provide one parallel current path for each of the three phases.

Clause 9. The fractional-slot-winding motor 200 of clause 6, wherein each of the plurality of fluid-passage slots 293 has a greater radial offset from a primary motor axis 201 than each of the plurality of stator slots 229.

Clause 10. The fractional-slot-winding motor 200 of clause 1, wherein: the plurality of coil units 280 comprises dual-leg coil units 250 and single-leg coil units 260, the dual-leg coil units 250 are only connected at the coil-interconnection side 291 of the stator 290; and the single-leg coil units 260 are connected at both the coil-interconnection side 291 and the bus-bar side 292 of the stator 290.

Clause 11. The fractional-slot-winding motor 200 of clause 10, wherein: a first-type-single-leg coil unit 261 of the single-leg coil units 260 comprises a first end 261a, a second end 261c, and a leg 261b, interconnecting the first end 261a and the second end 261c, a portion of the leg 261b protrudes through a first-single-leg-protruding slot 241b of the plurality of stator slots 299, and the first end 261a of the first-type-single-leg coil unit 261 of the single-leg coil units 260 is aligned over a first-end-first-single-leg-coil slot 241a of the plurality of stator slots 299 such that the first-end-first-single-leg-coil slot 241a is offset by two slots from the first-single-leg-protruding slot 241b.

Clause 12. The fractional-slot-winding motor 200 of clause 11, wherein the first end 261a of the first-type-single-leg coil unit 261 of the single-leg coil units 260 extends from the coil-interconnection side 291 and is radially offset closer to the primary axis 201 than the portion of the leg 261b protruding through the first-type-single-leg-protruding slot 241b of the plurality of stator slots 299.

Clause 13. The fractional-slot-winding motor 200 of clause 11, wherein the second end 261c of the first-type-single-leg coil unit 261 of the single-leg coil units 260 extends from the bus-bar side 292 and is radially offset further from the primary axis 201 than the portion of the leg 261b protruding through the first-single-leg-protruding slot 262b of the plurality of stator slots 299.

Clause 14. The fractional-slot-winding motor 200 of clause 10, wherein: the dual-leg coil units 250 comprise a first-type-dual-leg coil unit 251 comprising a turn portion 251c, a first leg 251d terminating with a first end 251a, and a second leg 251e terminating with a second end 251b, the turn portion 251c, the first leg 251d, and the second leg 251e of the first-type-dual-leg coil unit 251 collectively form a continuous monolithic structure, the first leg 251d of the first-type-dual-leg coil unit 251 protrudes through a first first-type-dual-leg-coil slot 231a of the plurality of stator slots 299, the second leg 251e protrudes through a second first-type-dual-leg-coil slot 231b of the plurality of stator slots 299, and the first first-type-dual-leg-coil slot 231a and the second first-type-dual-leg-coil slot 231b are offset by 4 slots.

Clause 15. The fractional-slot-winding motor 200 of clause 14, wherein (a) a portion of the first leg 251d of the first-type-dual-leg coil unit 251 protruding through the stator 290 and (b) a portion of the second leg 251e of the first-type-dual-leg coil unit 251 protruding through the stator 290 have different radial offsets from the primary axis 201.

Clause 16. The fractional-slot-winding motor 200 of clause 15, wherein: the first end 251a of the first leg 251d of the first-type-dual-leg coil unit 251 extends from the coil-interconnection side 291 and is radially offset closer to the primary axis 201 than the portion of the first leg 251d of the first-type-dual-leg coil unit 251 protruding through the stator 290, and the second end 251b of the second leg 251e of the first-type-dual-leg coil unit 251 extends from the coil-interconnection side 291 and is radially offset closer to the primary axis 201 than the portion of the second leg 251e of the first-type-dual-leg coil unit 251 protruding through the stator 290.

Clause 17. The fractional-slot-winding motor 200 of clause 10, wherein an end of each of the single-leg coil units 260 extending from the bus-bar side 292 is radially offset further away from the primary axis 201 than a portion of that one of the single-leg coil units 260 protruding through the stator 290.

Clause 18. The fractional-slot-winding motor 200 of clause 1, wherein an end of each of the plurality of coil units 280 extending from the coil-interconnection side 291 is radially offset closer to the primary axis 201 than a portion of that one of the plurality of coil units 280 protruding through the stator 290.

Clause 19. A powertrain assembly (110) comprising: a gearbox (190); and a fractional-slot-winding motor (200) comprising a stator (290), a bus-bar assembly (270), and a plurality of coil units (280) each extending through the stator (290), wherein: the stator (290) comprises a coil-interconnection side (291), a bus-bar side (292), a plurality of stator slots (299), and a plurality of fluid-passage slots (293); the plurality of stator slots (299) extend through the stator (290) parallel to the primary axis (201) between the coil-interconnection side (291) and the bus-bar side (292) and circumferentially offset from each other, the plurality of fluid-passage slots (293) extending through the stator (290) between the coil-interconnection side (291) and the bus-bar side (292) and circumferentially offset from each other, the plurality of fluid-passage slots (293) is configured to provide a fluid flow between the coil-interconnection side (291) and the bus-bar side (292), the bus-bar assembly (270) comprises a first bus bar (271), a second bus bar (272), and a third bus bar (273), adjacent to the bus-bar side (292) of the stator (290), each of the plurality of coil units (280) is electrically coupled to at least one other of the plurality of coil units (280) at the coil-interconnection side (291), a first one of the plurality of coil units (280) is electrically coupled to the first bus bar (271), a second one of the plurality of coil units (280) is electrically coupled to the second bus bar (272), and a third one of the plurality of coil units (280) is electrically coupled to the third bus bar (273).

Clause 20. An electric-vehicle (100) comprising: a frame (130); a powertrain assembly (110), attached to the frame (130) and comprising a gearbox (190) an a fractional-slot-winding motor (200), wherein the fractional-slot-winding motor (200) comprises a stator (290), a bus-bar assembly (270), and a plurality of coil units (280) each extending through the stator (290), wherein: the stator (290) comprises a coil-interconnection side (291), a bus-bar side (292), a plurality of stator slots (299), and a plurality of fluid-passage slots (293); the plurality of stator slots (299) extend through the stator (290) parallel to the primary axis (201) between the coil-interconnection side (291) and the bus-bar side (292) and circumferentially offset from each other, the plurality of fluid-passage slots (293) extending through the stator (290) between the coil-interconnection side (291) and the bus-bar side (292) and circumferentially offset from each other, the plurality of fluid-passage slots (293) is configured to provide a fluid flow between the coil-interconnection side (291) and the bus-bar side (292), the bus-bar assembly (270) comprises a first bus bar (271), a second bus bar (272), and a third bus bar (273), adjacent to the bus-bar side (292) of the stator (290), each of the plurality of coil units (280) is electrically coupled to at least one other of the plurality of coil units (280) at the coil-interconnection side (291), a first one of the plurality of coil units (280) is electrically coupled to the first bus bar (271), a second one of the plurality of coil units (280) is electrically coupled to the second bus bar (272), and a third one of the plurality of coil units (280) is electrically coupled to the third bus bar (273).

BRIEF DESCRIPTION OF THE DRAWINGS

FIG. 7A is a schematic side view of yet another example of a dual-leg coil unit, which may be referred to as a third-type-dual-leg coil unit or a plus-one-type-two coil unit/hairpin.

FIG. 7B is a schematic side view of the dual-leg coil unit in FIG. 7A, protruding through a stator, in accordance with some examples.

FIG. 7C is a schematic top view of the dual-leg coil unit in FIG. 7A, protruding through a stator, in accordance with some examples.

FIG. 10A is a schematic side view of yet another example of a dual-leg coil unit, which may be referred to as a sixth-type-dual-leg coil unit or a looped-type-one coil unit/hairpin.

FIG. 10B is a schematic side view of the dual-leg coil unit in FIG. 10A, protruding through a stator, in accordance with some examples.

FIG. 10C is a schematic top view of the dual-leg coil unit in FIG. 10A, protruding through a stator, in accordance with some examples.

FIG. 12A is a schematic side view of one example of a single-leg coil unit, which may be referred to as a first-type-single-leg coil unit or an extended-type-one coil unit/hairpin.

FIG. 12B is a schematic side view of the single-leg coil unit in FIG. 12A, protruding through a stator, in accordance with some examples.

FIG. 12C is a schematic top view of the single-leg coil unit in FIG. 12A, protruding through a stator, in accordance with some examples.

FIG. 13A is a schematic side view of another example of a single-leg coil unit, which may be referred to as a second-type-single-leg coil unit or an extended-type-two coil unit/hairpin.

FIG. 13B is a schematic side view of the single-leg coil unit in FIG. 13A, protruding through a stator, in accordance with some examples.

FIG. 13C is a schematic top view of the single-leg coil unit in FIG. 13A, protruding through a stator, in accordance with some examples.

DETAILED DESCRIPTION

Figure 1A:
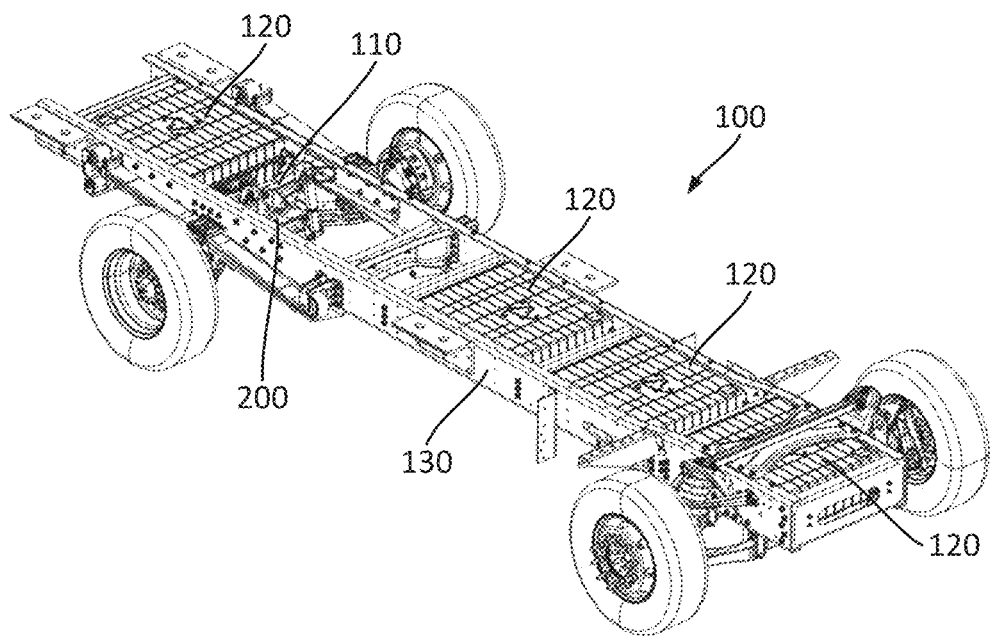
FIG. 1A is a schematic perspective view of an electric vehicle comprising a fractional-slot-winding motor integrated into a powertrain assembly further comprising a gearbox and a differential, in accordance with some examples.

In the following description, numerous specific details are outlined to provide a thorough understanding of the presented concepts. The presented concepts may be practiced without some or all these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Electric motors can be used in various power systems, such as electric vehicles. Often, such applications require high power densities from electric motors, e.g., restricting the motor size while demanding high power outputs. The motor size can be reduced while the efficiency can be increased by increasing the volume of coil units passing through the stator, which can be achieved by using certain cross-sectional shapes (e.g., shapes with relatively sharp corners) to achieve higher slot-to-fill ratios by reducing the spacing around the coil units. The volume of coil units passing through the stator can be also increased by increasing the cross-sectional area of each coil unit by minimizing the number of coil unit passing through a given cross-sectional area. Specifically, the spacing and the insulator between individual coil units need to be minimized.

Furthermore, the routing (e.g., winding) difficulty often results in larger winding extensions at each side of the stator. Larger (tall) winding extensions increase the overall motor size thereby reducing its power density. Using individual coil units, rather than a continuous wound wire, can simplify these windings complexities but increases the number of connections required among these coil units. Furthermore, the type and connections among the coil units depend on the motor type and can be quite complex for fractional-slot-winding motors. As a result, fractional-slot-winding motors are not commonly used because of these complexities resulting in higher costs.

However, fractional-slot-winding motors offer several advantages over other motor types, such as integer slot electric motors. One notable benefit is their ability to significantly reduce cogging torque, which occurs when the rotor poles align with magnetic stator features, resulting in an oscillatory torque. By minimizing cogging torque, fractional-slot-winding motors effectively decrease noise, vibration, and harshness in the motor itself and surrounding structures like vehicle frames. Cogging torque is a phenomenon that affects the smooth operation of electric motors. It occurs when the magnetic attraction between the rotor and stator poles causes irregularities in the motor's rotational movement. This can lead to noticeable vibrations, audible noise, and undesirable effects on the motor's performance.

Fractional-slot-winding motors utilize a unique winding configuration that reduces cogging torque compared to motors with integer slot windings. The winding arrangement divides each slot into smaller fractional slots, increasing the number of pole pairs. This design effectively spreads the rotor poles across a greater number of stator teeth, minimizing the chances of pole alignment and reducing cogging torque. By reducing cogging torque, fractional-slot-winding motors provide smoother and quieter operation. This is particularly beneficial in applications where noise, vibration, and harshness (NVH) levels need to be minimized, such as in electric vehicles. NVH reduction not only improves the overall comfort of vehicle occupants but also enhances the longevity and reliability of the motor by minimizing stress on its components. Additionally, the lower cogging torque of fractional-slot-winding motors can have a positive impact on energy efficiency. Reduced cogging torque means less energy is wasted in overcoming the resistance caused by cogging, resulting in improved overall motor efficiency.

Described herein are fractional-slot-winding motors addressing various issues described above. Specifically, a fractional-slot-winding motor can be used in electric vehicles, one example of which is presented in FIG. 1A. FIG. 1A illustrates electric vehicle 100 or, more specifically, the frame portion of electric vehicle 100 such as medium-duty trucks (e.g., delivery trucks, Class 2-5 trucks). For example, Class 2 medium-duty trucks have a gross vehicle weight rating (GVWR) between 2,722 and 4,536 kilograms and are used, e.g., for local delivery, small-scale construction, and utility services (as box trucks, flatbed trucks, and tow trucks). Class 3 medium-duty trucks have a GVWR ranging from 4,536 to 6,350 kilograms; Class 4 trucks have a GVWR between 6,350 and 7,257 kilograms; Class 5 trucks have a GVWR between from 7,257 to 8,845 kilograms (e.g., used for towing large trailers, carrying construction materials, and operating specialized equipment). All of the listed classes are within the scope.

It should be noted that medium-duty trucks tend to have different drive cycles than, e.g., passenger cars and light-duty trucks. For example, medium-duty trucks (e.g., used for delivery) may be operated at lower speeds and require higher torques, which translates in different requirements/design features for fractional-slot-winding motors as further described below. For example, a fractional-slot-winding motor may have a plurality of stator slots and a plurality of coil units that are arranged into a 1.5-slot per pole per phase configuration, which enable these lower speed and higher torque operating characteristics. Lighter/faster vehicles tend to have a higher number of slots per pole per phase.

In some examples, a fractional-slot-winding motor has a nominal power of between about 300-350 kW. In the same or other examples, the fractional-slot-winding motor has a nominal torque of between about 2000-3500 Nm. In some examples, a fractional-slot-winding motor has a top rotational speed of between about 8,000-12,000 RPM. In some examples, the components of the fractional-slot-winding motor are such that the fractional-slot-winding motor is operational at a temperature of up to 220° C. For comparison, conventional fractional-slot-winding motors are capable of operating up to only 180° C.

Referring to FIG. 1A, in some examples, electric vehicle 100 comprises powertrain assembly 110 comprising fractional-slot-winding motor 200 and other components (e.g., a gearbox). Electric vehicle 100 further comprises frame 130 used for supporting powertrain assembly 110 relative to other components of electric vehicle 100. Frame 130 can be specially configured to accommodate powertrain assembly 110 while maintaining frame 130 close to the ground. For example, a portion of powertrain assembly 110 can protrude in between the two rails of frame 130. Electric vehicle 100 further comprises one or more battery packs 120, which can be attached to and supported by frame 130. In some examples, battery packs 120 are positioned between the frame rails such that these frame rails protect these battery pack 120 and provide a compact arrangement.

Figure 1B:
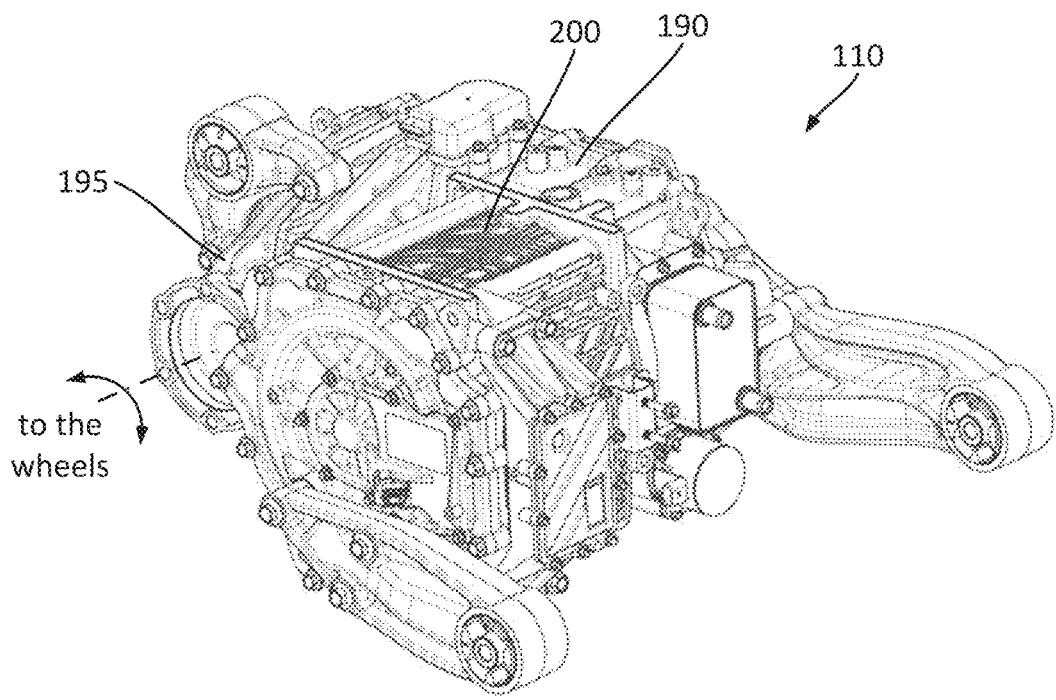
FIG. 1B is a schematic perspective view of a powertrain assembly comprising a fractional-slot-winding motor, a gearbox, and a differential, in accordance with some examples.

Referring to FIG. 1B, in some examples, powertrain assembly 110 comprises fractional-slot-winding motor 200, which provides its output to gearbox 190. In some examples, fractional-slot-winding motor 200 and gearbox 190 share the same housing, cooling systems, and/or lubrication systems. For example, a plurality of fluid-passage slots in fractional-slot-winding motor 200 can be fluidically coupled to the common fluid management system (e.g., a pump) of powertrain assembly 110. In some examples, powertrain assembly 110 comprises differential 195, which may be a separate unit or integrated into gearbox 190. Differential 195 is mechanically coupled to the wheels of electric vehicle 100 and provides torque to these wheels.

Figure 1C:
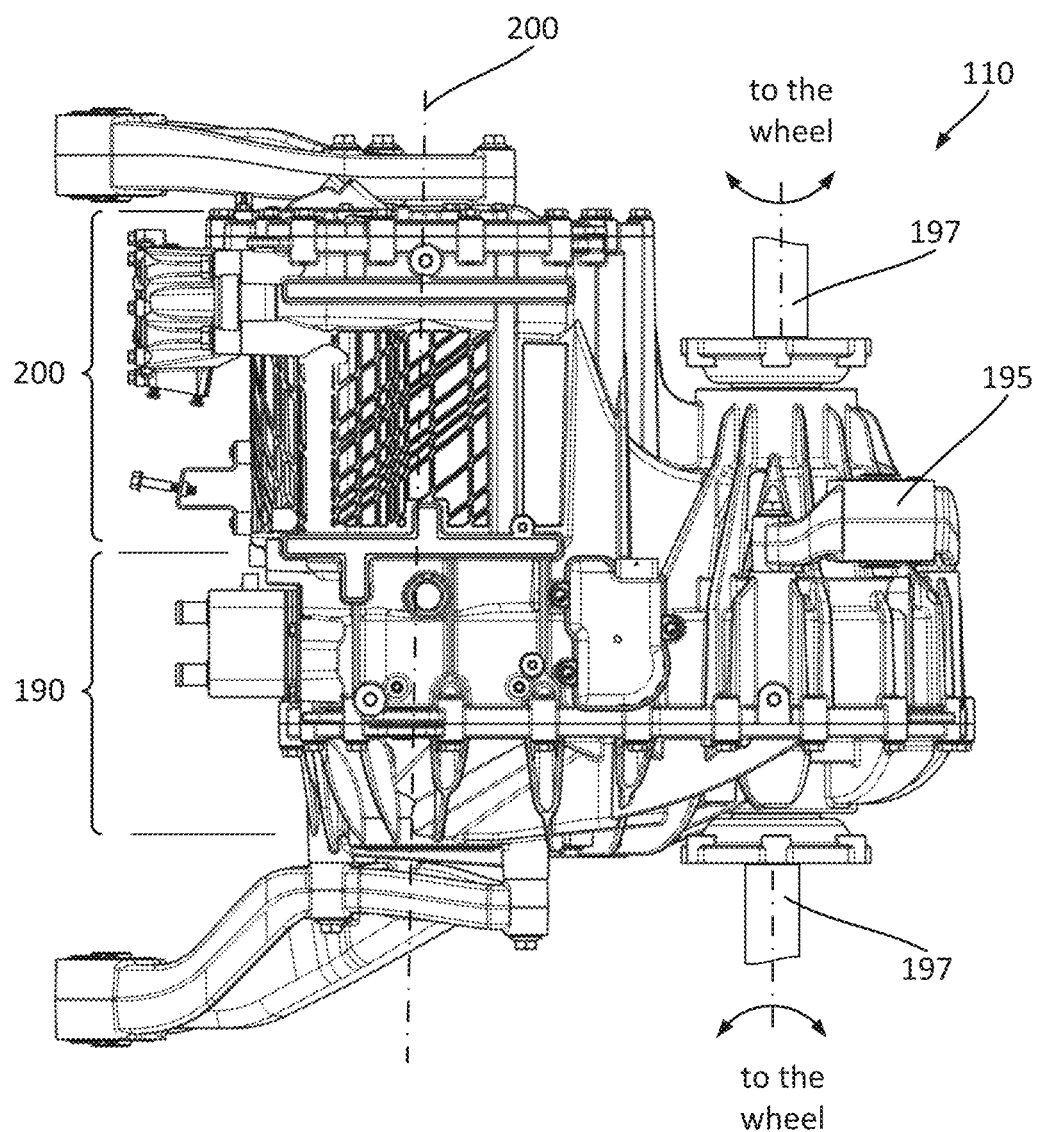
FIG. 1C is a schematic top view of the powertrain assembly in FIG. 1B, in accordance with some examples.

FIG. 1C is a schematic top view of powertrain assembly 110 illustrating the orientation of fractional-slot-winding motor 200 relative to half-shafts 197 connecting differential 195 to the wheels of electric vehicle 100. In some examples, primary axis 201 of fractional-slot-winding motor 200 is parallel to the half-shafts 197. As such, the axis defining torque input (provided by fractional-slot-winding motor 200) and the axis defining the torque output by powertrain assembly 110 are parallel in this example.

Examples of Fractional-Slot-Winding Motors

Figure 2A:
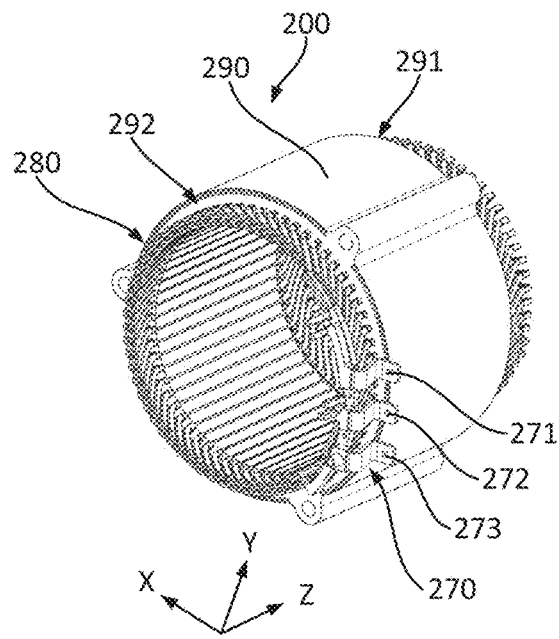
FIG. 2A is a schematic perspective view of a fractional-slot-winding motor, in accordance with some examples.
Figure 2B:
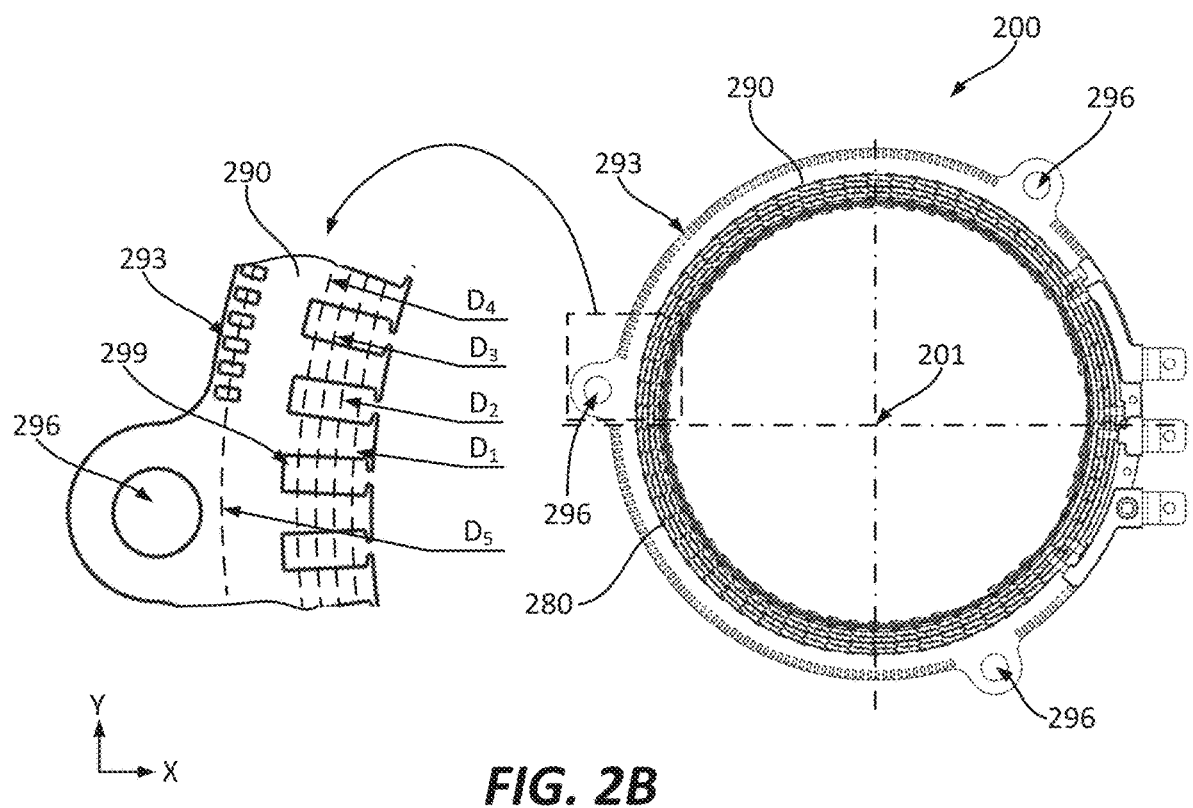
FIG. 2B is a schematic top view of the fractional-slot-winding motor in FIG. 2A and an expanded view of a portion of the rotor illustrating a plurality of stator slots, a plurality of fluid-passage slots, and a plurality of assembly slots, in accordance with some examples.
Figure 2C:
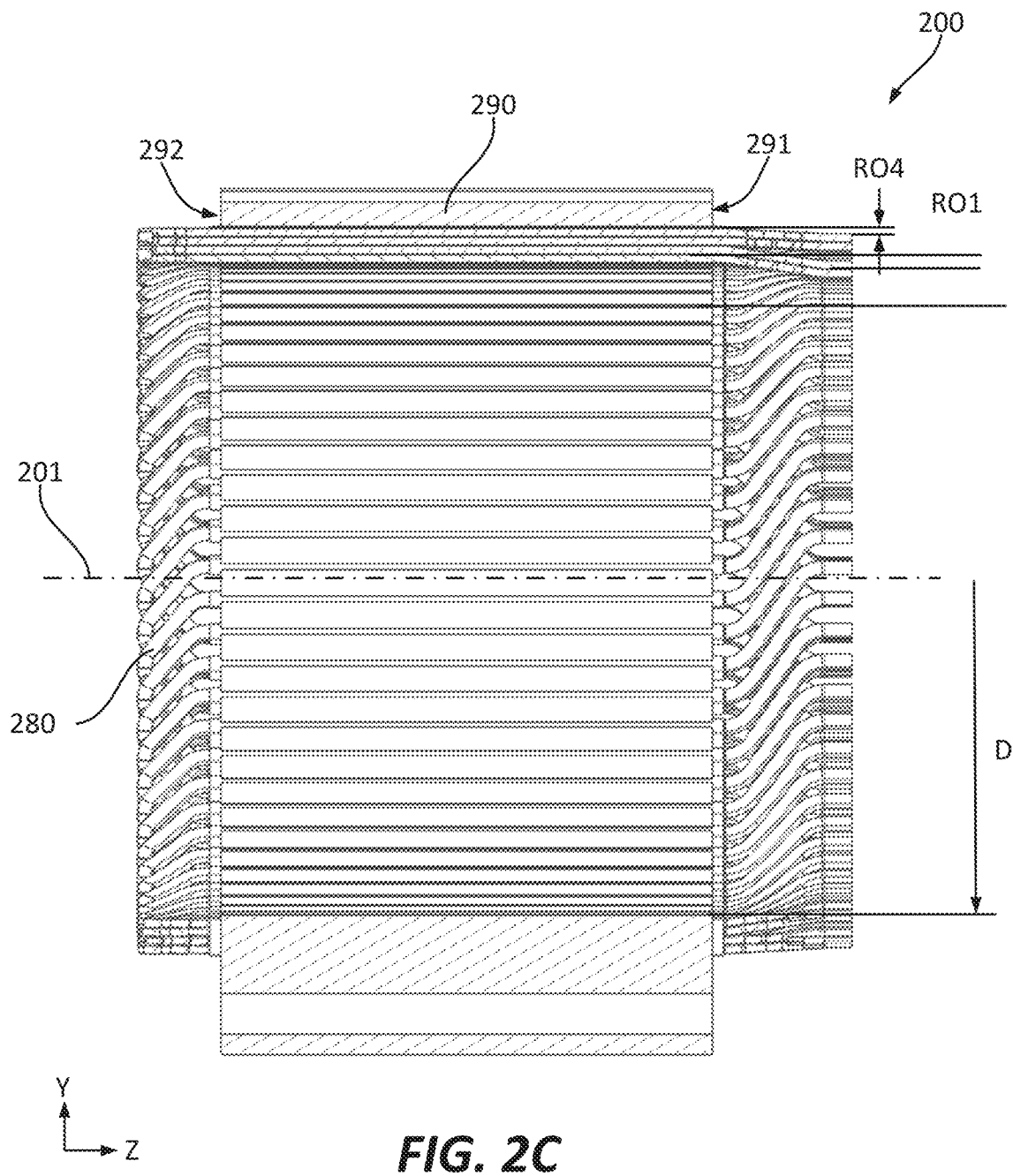
FIG. 2C is a schematic side view of the fractional-slot-winding motor in FIG. 2A illustrating the ends of coil units at the coil-interconnection side positioned closer to the motor primary axis than the protruding portions of the same coil units, in accordance with some examples.

Referring to FIGS. 2A-2C, in some examples, fractional-slot-winding motor 200 comprises stator 290, bus-bar assembly 270, and plurality of coil units 280. Stator 290 has coil-interconnection side 291 and bus-bar side 292. Furthermore, stator 290 comprises plurality of stator slots 299 extending through stator 290 between coil-interconnection side 291 and bus-bar side 292 and circumferentially offset relative to each other. In some examples, stator 290 comprises sixty three (63) stator slots 299. Each coil slot can accommodate four coil units 280. The radial positions of each of the four coil units in each stator slot is identified in the expanded partial view of stator 290 in FIG. 1B by four diameters (D1, D2, D3, and D4). These diameters define the radial offset (from primary axis 201). Besides the radial offset with stator slots 299 (i.e., the portions of coil units 280 extending through stator 290), plurality of coil units 280 can also have various radial outside of stator 290.

In some examples, stator 290 comprises plurality of fluid-passage slots 293 extending through stator 290 between coil-interconnection side 291 and bus-bar side 292 and circumferentially offset relative to each other. Plurality of fluid-passage slots 293 is configured to provide a coolant flow between coil-interconnection side 291 and bus-bar side 292 and through stator 290 for cooling stator 290. The cross-sectional area of each cooling slot 293 can be smaller than that of stator slots 299. However, the number of cooling slot 293 can be greater than that of stator slots 299. Each of plurality of fluid-passage slots 293 can have a greater radial offset from primary motor axis 201 than each of plurality of stator slots 299. In some examples, fluid-passage slots 293 are positioned proximate to the outer surface of stator 290.

Furthermore, in some examples, stator 290 comprises plurality of assembly slots 296 extending through stator 290 between coil-interconnection side 291 and bus-bar side 292 and circumferentially offset relative to each other. Each of plurality of assembly slots 296 has a greater radial offset from a primary motor axis 201 than each of plurality of fluid-passage slots 293. For example, stator 290 can be formed by stacking a large number of thin sheets that are laminated together. A set of fasteners can be protruded through assembly slots 296, e.g., to maintain this stack together and/or to support fractional-slot-winding motor 200 relative to its attachment point (e.g., within powertrain assembly 110).

Figure 3A:
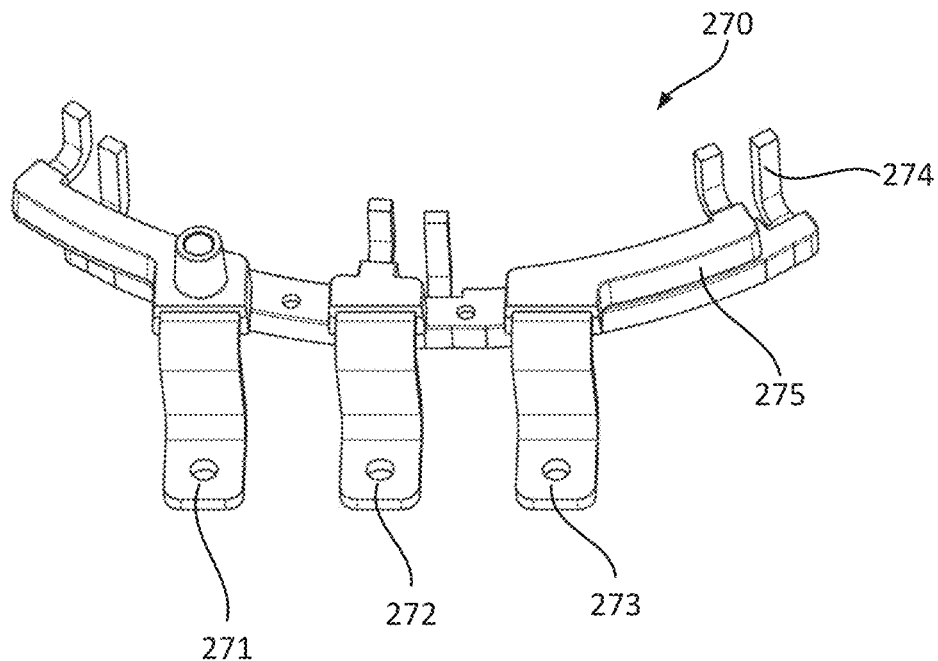
FIG. 3A is a schematic perspective view of a bus-bar assembly for use in a fractional-slot-winding motor, in accordance with some examples.
Figure 3B:
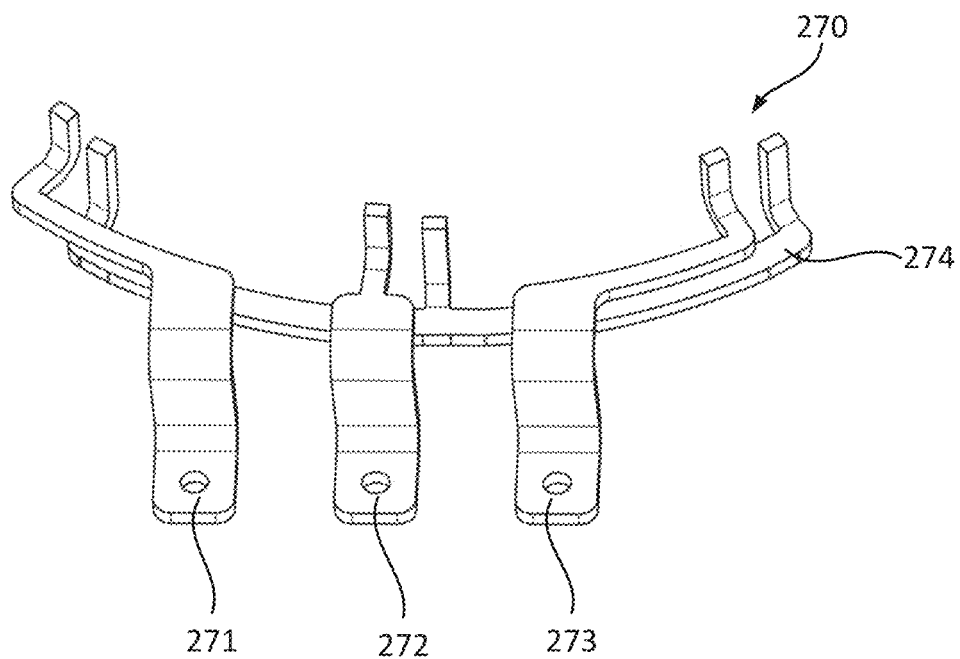
FIG. 3B is a schematic perspective view of the bus-bar assembly in FIG. 3A without the insulator, in accordance with some examples.

Referring to FIGS. 2A-2C as well as FIGS. 3A-3B, bus-bar assembly 270 comprises first bus bar 271, second bus bar 272, and third bus bar 273, each connected to at least one of coil units 280. In some examples, first bus bar 271 is connected to only one of plurality of coil units 280 (e.g., single-leg coil unit 260). Similarly, second bus bar 272 can be connected to only one of plurality of coil units 280 (e.g., another single-leg coil unit 260). Finally, third bus bar 273 can be connected to only one of plurality of coil units 280 (e.g., yet another single-leg coil unit 260). Bus-bar assembly 270 is positioned adjacent to bus-bar side 292 of stator 290.

In some examples, bus-bar assembly 270 further comprises neutral busbar 274, electrically coupled to three of plurality of coil units 280. Neutral busbar 274 is connected to three different coil units 280 (e.g., three different single-leg coil units 260). In some examples, plurality of coil units 280 comprises only six single-leg coil units 260, three of which are connected to first bus bar 271, second bus bar 272, and third bus bar 273 and three of which are connected to neutral busbar 274. All other coil units 280 are dual-leg coil units 250. In these examples, fractional-slot-winding motor 200 does not have any coil jumpers, which interconnect single-leg coil units 260 at bus-bar side 292 (besides the connections provided by neutral busbar 274).

Furthermore, in some examples, bus-bar assembly 270 insulator 275, which provides insulation among different bus bars while mechanically supporting these bus bars relative to each other. For example, insulator 275 can comprise a first insulator component, positioned between and supporting first bus bar 271 relative to neutral busbar 274. Insulator 275 can also comprise a second insulator component, positioned between and supporting second bus bar 272 relative to the neutral busbar 274. Finally, insulator 275 can also comprise a third insulator component, positioned between and supporting third bus bar 273 relative to neutral busbar 274. In some examples, these three components of insulator 275 are disjoined structures.

Figure 3C:
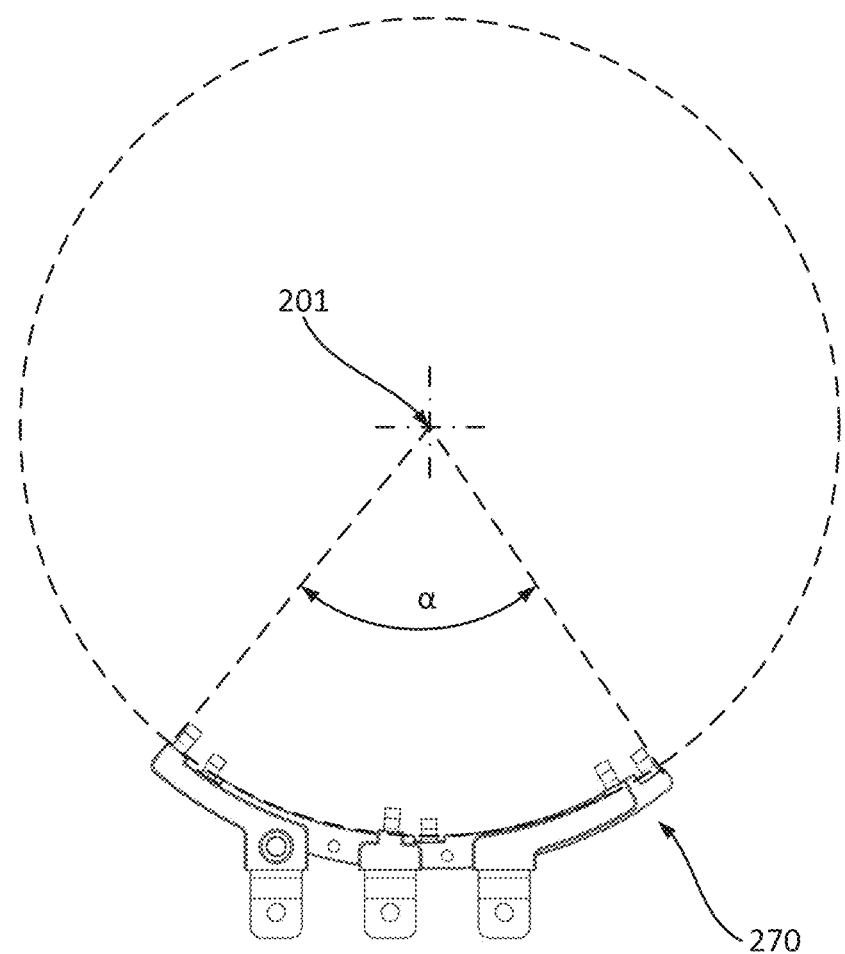
FIG. 3C is a schematic top view of the bus-bar assembly in FIG. 3A illustrating the circumferential span of the bus-bar assembly, in accordance with some examples.

Referring to FIG. 3C, in some examples, bus-bar assembly 270 has a circumferential span (angle α) of less than 180 degrees, less than 90 degrees, or even less than 60°. This limited circumferential span reduces the size of fractional-slot-winding motor 200 by providing space for other components. This circumferential span is enabled by special locations of coil units 280 or, more specifically, single-leg coil units 260 within stator 290. Furthermore, as noted above, each non-neutral bus bar forms only one attachment to the corresponding coil unit. As a reference, bus-bar assemblies typically form a full circle in these types of motors because of the multiple attachments and locations of these attachments.

Returning to FIG. 2C, each coil unit 280 extends through stator 290 and is electrically coupled to at least one other coil unit 280 at coil-interconnection side 291. For example, each single-leg coil unit is electrically coupled to only one other coil unit 280 at coil-interconnection side 291. Each dual-leg coil unit is electrically coupled to two other coil units 280 at coil-interconnection side 291. Furthermore, in some examples, one of the single-leg coil units is electrically coupled to first bus bar 271, another one—to second bus bar 272, and yet another one—to third bus bar 273. Additional (three) single-leg coil units can be coupled to neutral busbar 274. In some examples, plurality of coil units 280 form 14 electric poles in fractional-slot-winding motor 200.

Referring to FIG. 2C, in some examples, the ends of each coil unit 280 can be bent toward primary axis 201 of fractional-slot-winding motor 200 at least at coil-interconnection side 291 of stator 290, therefore, reducing the size of the winding extensions and the overall size of fractional-slot-winding motor 200. In other words, the end of each coil unit 280 extending from coil-interconnection side 291 is radially offset closer to primary axis 201 than the corresponding portion of that coil units 280 protruding through stator 290. These coil portions may be also referred to as an interconnection-side extending portion and a protruding portion. In some examples, the radial offset is between 0.5 mm and 6 mm or, more specifically, between 1 mm and 5 mm. It should be noted that this radial offset can be used to reduce the overall size of fractional-slot-winding motor 200, e.g., by pushing the protruding portions closer to primary axis 201.

In some examples, the radial offset is different for different radial slot positions of the protruding portion. These radial slot positions are defined above with reference to FIG. 1B as D1 (representing to the innermost slot position), D2, D3, and D4 (representing to the outermost slot position). For example, the radial offset (RO1) for the innermost slot position (D1) can be greater than the radial offset (RO4) for the outermost slot position (D4). This difference in radial offset is used to simplify the wire routing on coil-interconnection side 291 and effectively reduce the protruding dimension (along primary axis 201/Z-axis in FIG. 2C). In some examples, the ratio of the innermost radial offset (RO1) to the outermost radial offset (RO4) is at least 2 or even at least 3 or even at least 4 such as between 2 and 10 or, more specifically, between 3 and 6. In some examples, the ratio of the innermost radial offset (RO1) is between 2 mm and 8 mm or, more specifically, between 3 mm and 5 mm. In the same or other examples, the ratio of the outermost radial offset (RO4) is between 0.2 mm and 4 mm or, more specifically, between 0.5 mm and 3 mm. As a reference, the diameter of the stator opening is between 250 mm and 300 mm.

Examples of Coil Units

Coil units 280 may have a rectangular cross-sectional profile (within the plane parallel to coil-interconnection side 291 or bus-bar side 292 of stator 290). The rectangular profile ensure that more metal (a larger volume portion of coil units 280) is positioned in each stator slot 299. Furthermore, a large size of this rectangular cross-sectional profile may help to increase the metal fill. In some examples, each side of this rectangular cross-sectional profile is at least 2 mm, e.g., between 2-6 mm or, more specifically, between 3-5 mm.

As noted above, coil units 280 comprises dual-leg coil units 250 and single-leg coil units 260. Dual-leg coil units 250 are only connected at coil-interconnection side 291 of stator 290, e.g., to other dual-leg coil units 250 and single-leg coil units 260. Single-leg coil units 260 are connected at both coil-interconnection side 291 and bus-bar side 292 of stator 290. As noted above, single-leg coil units 260 are connected to bus-bar assembly 270 at bus-bar side 292. In some examples, single-leg coil units 260 are only connected to bus-bar assembly 270 at bus-bar side 292. Various examples of dual-leg coil units 250 and single-leg coil units 260 will now be described with reference to FIGS. 4A-13C.

Figure 4A:
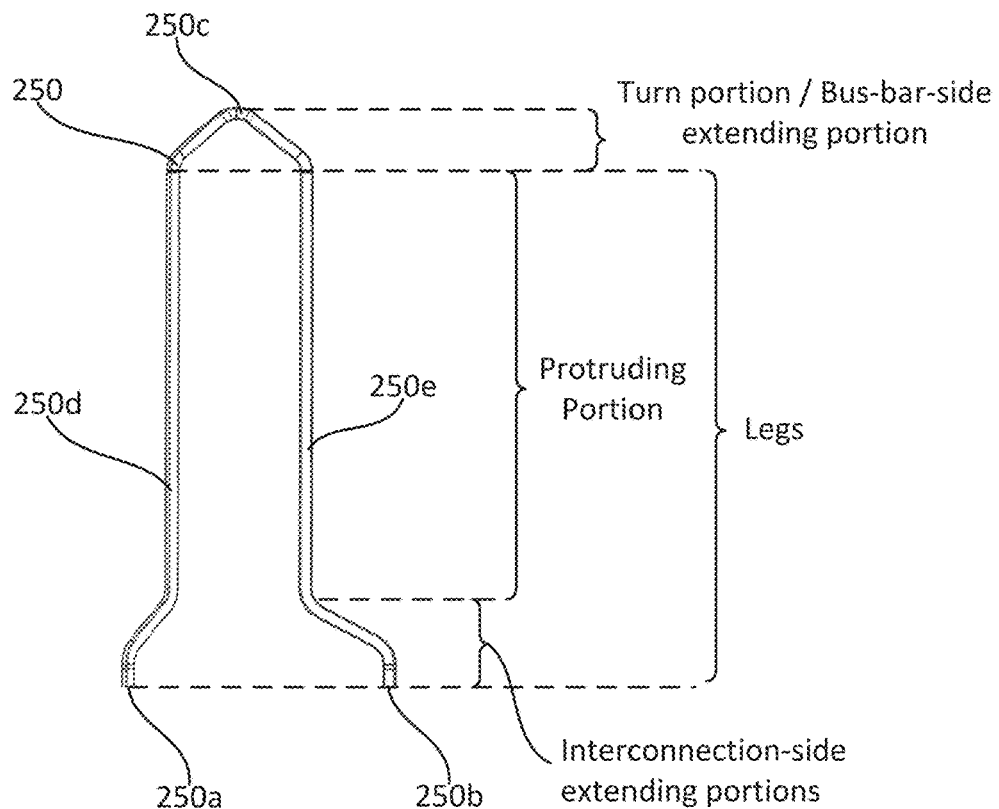
FIGS. 4A and 4B are schematic side views of a dual-leg coil unit and a single-leg coil unit, identifying various components of these coil units, in accordance with some examples.

Referring to FIG. 4A, each dual-leg coil unit 250 comprises turn portion 250c, first leg 250d comprising first end 250a, and second leg 250e comprising second end 250b such that turn portion 250c interconnects first leg 250d and second leg 250e and such that turn portion 250c, first leg 250d, and second leg 250e form a continuous monolithic structure. It should be noted that turn portion 250c of each dual-leg coil unit 250 extends from stator 290 at bus-bar side 292. Turn portion 250c may be also referred to as a bus-bar-side extending portion of dual-leg coil unit 250. A virtual interface between turn portion 250c and each of first leg 250d and second leg 250e can be defined by the start of straight portions of these legs. It should be noted that these straight portions at least partially protrude through stator 290, which can be referred to as protruding portions. In some examples, the straight portions coincide with the protruding portions. Alternatively, the straight portions are longer than the protruding portions. Additional portions of first leg 250d and second leg 250e extend past the protruding portions and can be referred to as interconnection-side extending portions. These interconnection-side extending portions comprise first end 250a and second end 250b.

Figure 4B:
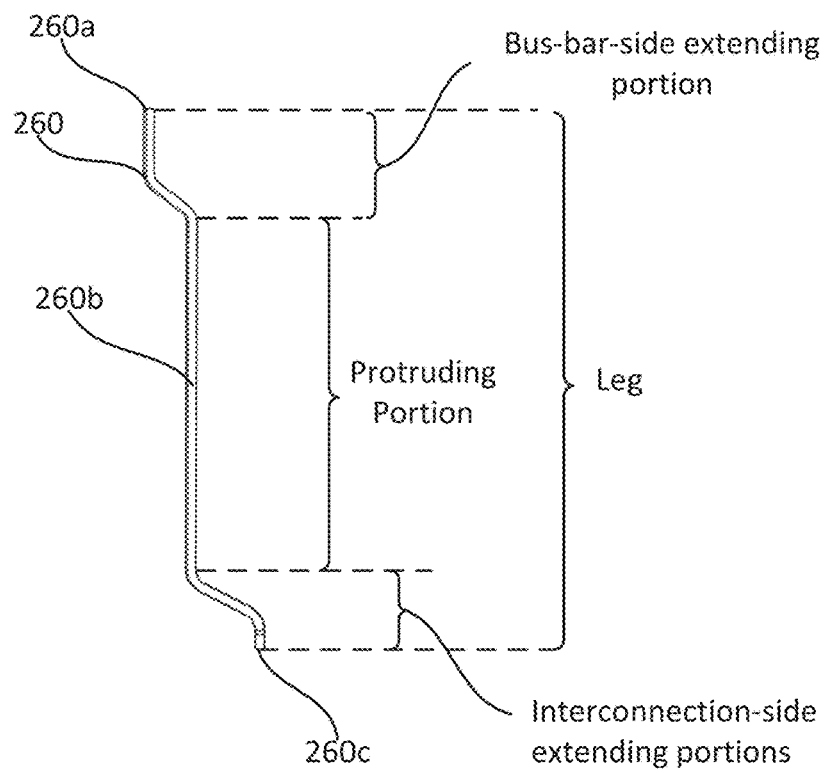

Referring to FIG. 4B, in some examples, single-leg coil unit 260 comprises leg 260b, extending between first end 260a and second end 260c, opposite of first end 260a. Leg 260b partially protrudes through stator 290 and can be referred to as a protruding portion. In some examples, the straight portion of leg 260b coincides with the protruding portion. Alternatively, the straight portion is longer than the protruding portion.

Different types of dual-leg coil units 250 and/or different types of single-leg coil units 260 are within the scope as further described below with reference to FIGS. 5A-13C. In some examples, the same fractional-slot-winding motor 200 can include multiple different types of dual-leg coil units 250 and/or multiple different types of single-leg coil units 260, e.g., as indicated in the table below.

| Type of Coil Unit | Alternative Name | Quantity in One Motor Example |
| --- | --- | --- |
| First-type-dual-leg coil unit | Layer-jump coil unit | 3 |
| Second-type-dual-leg coil unit | Plus-one-type-one coil unit | 3 |
| Third-type-dual-leg coil unit | Plus-one-type-two coil unit | 3 |
| Fourth-type-dual-leg coil unit | Standard-type-one coil unit | 54 |
| Fifth-type-dual-leg coil unit | Standard-type-two coil unit | 54 |
| Sixth-type-dual-leg coil unit | Looped-type-one coil unit | 3 |
| Seventh-type-dual-leg coil unit | Looped-type-two coil unit | 3 |
| First-type-single-leg coil unit | Extended-type-one coil unit | 3 |
| Second-type-single-leg coil unit | Extended-type-two coil unit | 3 |

Examples of Dual-Leg Coil Units

Figure 5A:
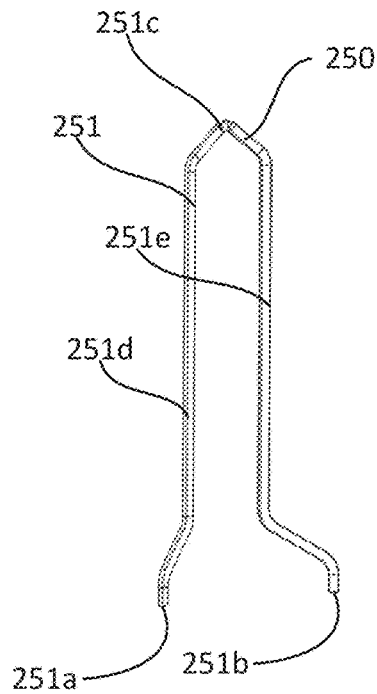
FIG. 5A is a schematic side view of one example of a dual-leg coil unit, which may be referred to as a first-type-dual-leg coil unit or a layer-jump coil unit/hairpin.
Figure 5B:
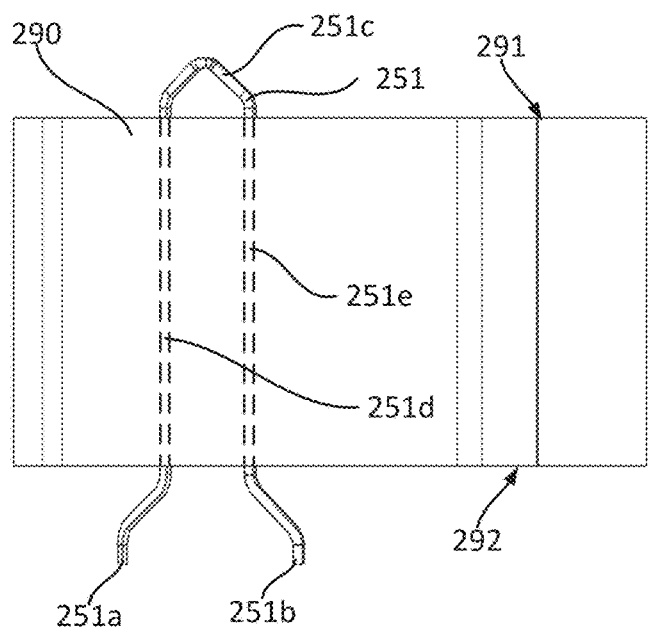
FIG. 5B is a schematic side view of the dual-leg coil unit in FIG. 5A, protruding through a stator, in accordance with some examples.
Figure 5C:
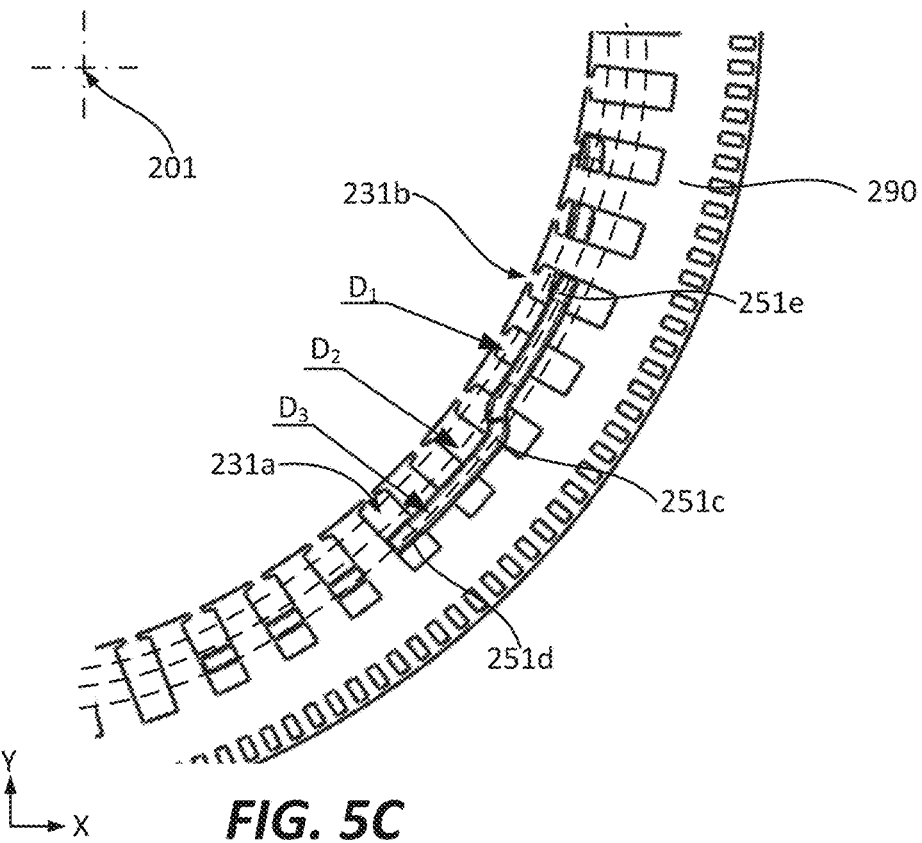
FIG. 5C is a schematic top view of the dual-leg coil unit in FIG. 5A, protruding through a stator, in accordance with some examples.

FIG. 5A is a schematic side view of one example of dual-leg coil unit 250, which may be referred to as first-type-dual-leg coil unit 251 or a layer-jump coil unit/hairpin. FIGS. 5B and 5C are schematic views of first-type-dual-leg coil unit 251 in FIG. 5A, protruding through stator 290, in accordance with some examples. Specifically, first-type-dual-leg coil unit 251 comprises turn portion 251c, first leg 251d terminating with first end 251a, and second leg 251e terminating with second end 251b. Turn portion 251c, first leg 251d, and second leg 251e of first-type-dual-leg coil unit 251 collectively form a continuous monolithic structure. Referring to FIG. 5C, first leg 251d of first-type-dual-leg coil unit 251 protrudes through first first-type-dual-leg-coil slot 231a of plurality of stator slots 299. Second leg 251e protrudes through second first-type-dual-leg-coil slot 231b of plurality of stator slots 299. In this example, first firsttype-dual-leg-coil slot 231*a* and second first-type-dual-leg-coil slot 231*b* are offset by 4 slots.

In some examples, (a) a portion of first leg 251*d* of first-type-dual-leg coil unit 251 protruding through stator 290 and (b) a portion of second leg 251*e* of first-type-dual-leg coil unit 251 protruding through stator 290 has different radial offsets from primary axis 201 (e.g., D3 for the protruding portion of first leg 251*d* vs. D2 for the protruding portion of second leg 251*e*). In other words, turn portion 251*c* of first-type-dual-leg coil unit 251 makes a radial "jump". This radial jump should be distinguished from the radial offset that turn portion 251*c* of first-type-dual-leg coil unit 251 can have relative to the protruding portion of first leg 251*d* and also relative to the protruding portion of second leg 251*e*.

In some examples, first end 251*a* of first leg 251*d* of first-type-dual-leg coil unit 251 extends from coil-interconnection side 291 and is radially offset closer to primary axis 201 than the portion of first leg 251*d* of first-type-dual-leg coil unit 251 protruding through stator 290. Furthermore, second end 251*b* of second leg 251*e* of first-type-dual-leg coil unit 251 extends from coil-interconnection side 291 and is radially offset closer to primary axis 201 than the portion of second leg 251*e* of first-type-dual-leg coil unit 251 protruding through stator 290. However, in some examples, turn portion 251*c* of first-type-dual-leg coil unit 251 is radially offset further away from primary axis 201 than the portions of first leg 251*d* and second leg 251*e* of first-type-dual-leg coil unit 251 protruding through stator 290, e.g., by between 1-5 millimeters, such as 2-4 millimeters, or about 3 millimeters.

Figure 6A:
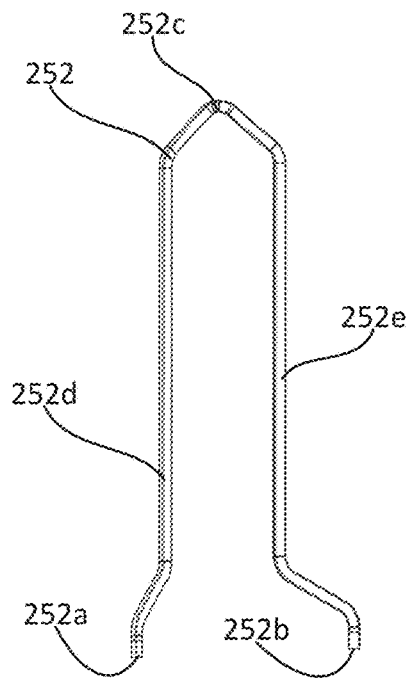
FIG. 6A is a schematic side view of another example of a dual-leg coil unit, which may be referred to as a second-type-dual-leg coil unit or a plus-one-type-one coil unit/hairpin.
Figure 6B:
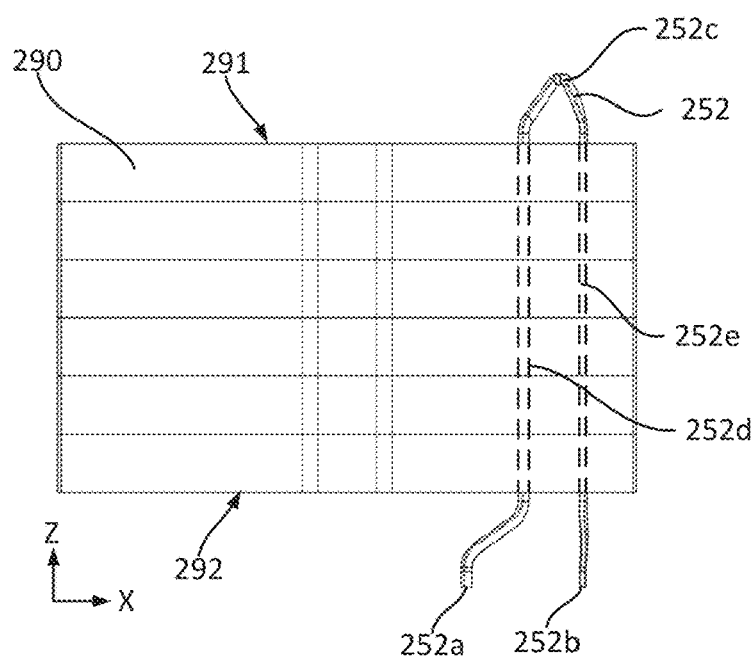
FIG. 6B is a schematic side view of the dual-leg coil unit in FIG. 6A, protruding through a stator, in accordance with some examples.
Figure 6C:
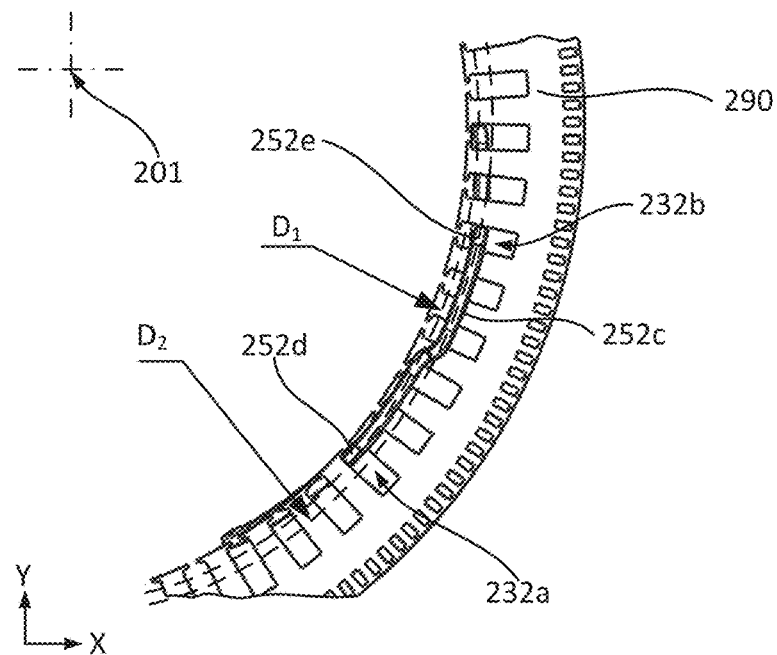
FIG. 6C is a schematic top view of the dual-leg coil unit in FIG. 6A, protruding through a stator, in accordance with some examples.

FIG. 6A is a schematic side view of another example of dual-leg coil unit 250, which may be referred to as second-type-dual-leg coil unit 252 or a plus-one-type-one coil unit/hairpin. FIGS. 6B and 6C are schematic views of second-type-dual-leg coil unit 252 in FIG. 6A, protruding through stator 290, in accordance with some examples. Specifically, second-type-dual-leg coil unit 252 comprises turn portion 252*c*, first leg 252*d* terminating with first end 252*a*, and second leg 252*e* terminating with second end 252*b*. Turn portion 252*c*, first leg 252*d*, and second leg 252*e* of second-type-dual-leg coil unit 252 collectively form a continuous monolithic structure. Referring to FIG. 6C, first leg 252*d* protrudes through first second-type-dual-leg-coil slot 232*a* of plurality of stator slots 299. Second leg 252*e* protrudes through second second-type-dual-leg-coil slot 232*b* of plurality of stator slots 299. In this example, first second-type-dual-leg-coil slot 232*a* and second second-type-dual-leg-coil slot 232*b* are offset by 5 slots.

In some examples, (a) a portion of first leg 252*d* of second-type-dual-leg coil unit 252 protruding through stator 290 and (b) a portion of second leg 252*e* of second-type-dual-leg coil unit 252 protruding through stator 290 has different radial offsets from primary axis 201 (e.g., D1 for the protruding portion of first leg 252*d* vs. D2 for the protruding portion of second leg 252*e*). In other words, turn portion 252*c* of second-type-dual-leg coil unit 252 makes a radial "jump". This radial jump should be distinguished from the radial offset that turn portion 252*c* of second-type-dual-leg coil unit 252 can have relative to the protruding portion of first leg 252*d* and also relative to the protruding portion of second leg 252*e*.

In some examples, first end 252*a* of first leg 252*d* of second-type-dual-leg coil unit 252 extends from coil-interconnection side 291 and is radially offset closer to primary axis 201 than the portion of first leg 252*d* of second-type-dual-leg coil unit 252 protruding through stator 290. Furthermore, second end 252*b* of second leg 252*e* of second-type-dual-leg coil unit 252 extends from coil-interconnection side 291 and is radially offset closer to primary axis 201 than the portion of second leg 252*e* of second-type-dual-leg coil unit 252 protruding through stator 290. However, in some examples, turn portion 252*c* of second-type-dual-leg coil unit 252 is radially offset further away from primary axis 201 than the portions of first leg 252*d* and second leg 252*e* of third-type-dual-leg coil unit 252 protruding through stator 290, e.g., by between 1-5 millimeters, such as 2-4 millimeters, or about 3 millimeters.

FIG. 7A is a schematic side view of yet another example of dual-leg coil unit 250, which may be referred to as third-type-dual-leg coil unit 253 or a plus-one-type-two coil unit/hairpin. FIGS. 7B and 7C are schematic views of third-type-dual-leg coil unit 253 in FIG. 7A, protruding through stator 290, in accordance with some examples. Specifically, third-type-dual-leg coil unit 253 comprises turn portion 253*c*, first leg 253*d* terminating with first end 253*a*, and second leg 253*e* terminating with second end 253*b*. Turn portion 253*c*, first leg 253*d*, and second leg 253*e* of third-type-dual-leg coil unit 253 collectively form a continuous monolithic structure. Referring to FIG. 7C, first leg 253*d* of third-type-dual-leg coil unit 253 protrudes through first third-type-dual-leg-coil slot 233*a* of plurality of stator slots 299. Second leg 253*e* protrudes through second third-type-dual-leg-coil slot 233*b* of plurality of stator slots 299. In this example, first third-type-dual-leg-coil slot 233*a* and second third-type-dual-leg-coil slot 233*b* are offset by 5 slots.

In some examples, (a) a portion of first leg 253*d* of third-type-dual-leg coil unit 253 protruding through stator 290 and (b) a portion of second leg 253*e* of third-type-dual-leg coil unit 253 protruding through stator 290 has different radial offsets from primary axis 201 (e.g., D3 for the protruding portion of first leg 253*d* vs. D4 for the protruding portion of second leg 253*e*). In other words, turn portion 253*c* of third-type-dual-leg coil unit 253 makes a radial "jump". This radial jump should be distinguished from the radial offset that turn portion 253*c* of third-type-dual-leg coil unit 253 can have relative to the protruding portion of first leg 253*d* and also relative to the protruding portion of second leg 253*e*.

In some examples, first end 253*a* of first leg 253*d* of third-type-dual-leg coil unit 253 extends from coil-interconnection side 291 and is radially offset closer to primary axis 201 than the portion of first leg 253*d* of third-type-dual-leg coil unit 253 protruding through stator 290. Furthermore, second end 253*b* of second leg 253*e* of third-type-dual-leg coil unit 253 extends from coil-interconnection side 291 and is radially offset closer to primary axis 201 than the portion of second leg 253*e* of third-type-dual-leg coil unit 253 protruding through stator 290. However, in some examples, turn portion 253*c* of third-type-dual-leg coil unit 253 is radially offset further away from primary axis 201 than the portions of first leg 253*d* and second leg 253*e* of third-type-dual-leg coil unit 253 protruding through stator 290, e.g., by between 1-5 millimeters, such as 2-4 millimeters, or about 3 millimeters.

Figure 8A:
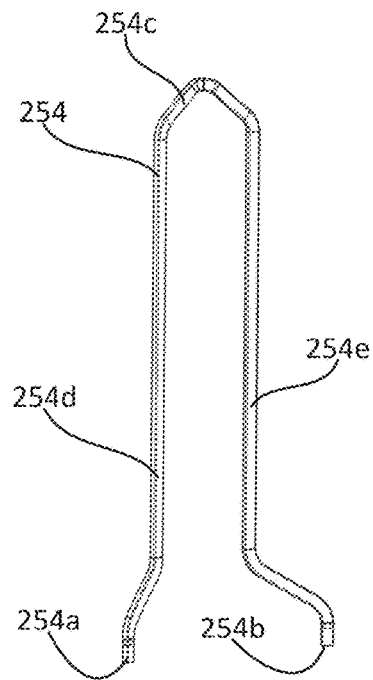
FIG. 8A is a schematic side view of a further example of a dual-leg coil unit, which may be referred to as a fourth-type-dual-leg coil unit or a standard-type-one coil unit/hairpin.
Figure 8B:
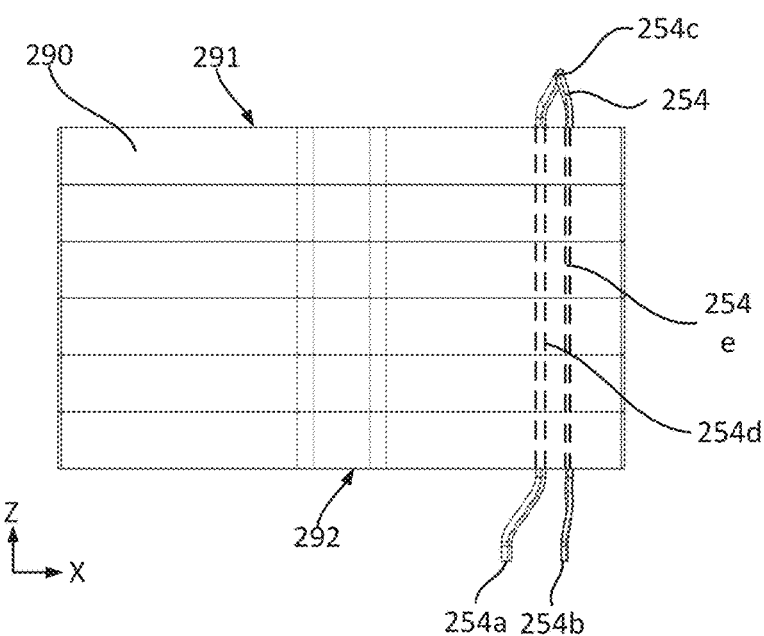
FIG. 8B is a schematic side view of the dual-leg coil unit in FIG. 8A, protruding through a stator, in accordance with some examples.
Figure 8C:
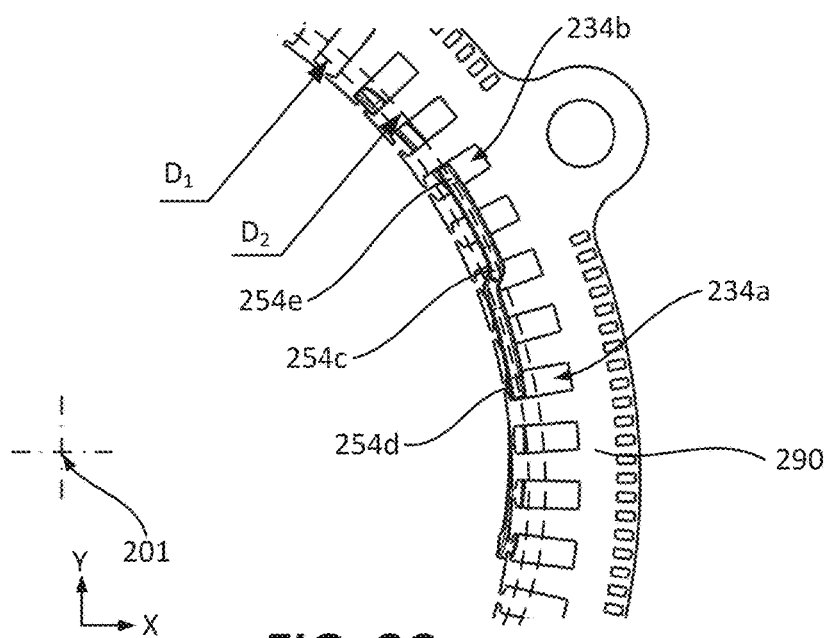
FIG. 8C is a schematic top view of the dual-leg coil unit in FIG. 8A, protruding through a stator, in accordance with some examples.

FIG. 8A is a schematic side view of a further example of dual-leg coil unit 250, which may be referred to as fourth-type-dual-leg coil unit 254 or a standard-type-one coil unit/hairpin. FIGS. 8B and 8C are schematic views of fourth-type-dual-leg coil unit 254 in FIG. 8A, protruding through stator 290, in accordance with some examples. Specifically, fourth-type-dual-leg coil unit 254 comprises turn portion 254*c*, first leg 254*d* terminating with first end 254a, and second leg 254e terminating with second end 254b. Turn portion 254c, first leg 254d, and second leg 254e of fourth-type-dual-leg coil unit 254 collectively form a continuous monolithic structure. Referring to FIG. 8C, first leg 254d of fourth-type-dual-leg coil unit 254 protrudes through first fourth-type-dual-leg-coil slot 235a of plurality of stator slots 299. Second leg 254e protrudes through second fourth-type-dual-leg-coil slot 235b of plurality of stator slots 299. In this example, first fourth-type-dual-leg-coil slot 235a and second fourth-type-dual-leg-coil slot 235b are offset by 4 slots.

In some examples, (a) a portion of first leg 254d of fourth-type-dual-leg coil unit 254 protruding through stator 290 and (b) a portion of second leg 254e of fourth-type-dual-leg coil unit 254 protruding through stator 290 has different radial offsets from primary axis 201 (e.g., D1 for the protruding portion of first leg 254d vs. D2 for the protruding portion of second leg 254e). In other words, turn portion 254c of fourth-type-dual-leg coil unit 254 makes a radial "jump". This radial jump should be distinguished from the radial offset that turn portion 254c of fourth-type-dual-leg coil unit 254 can have relative to the protruding portion of first leg 254d and also relative to the protruding portion of second leg 254e.

In some examples, first end 254a of first leg 254d of fourth-type-dual-leg coil unit 254 extends from coil-interconnection side 291 and is radially offset closer to primary axis 201 than the portion of first leg 254d of fourth-type-dual-leg coil unit 254 protruding through stator 290. Furthermore, second end 254b of second leg 254e of fourth-type-dual-leg coil unit 254 extends from coil-interconnection side 291 and is radially offset closer to primary axis 201 than the portion of second leg 254e of fourth-type-dual-leg coil unit 254 protruding through stator 290. However, in some examples, turn portion 254c of fourth-type-dual-leg coil unit 254 is radially offset further away from primary axis 201 than the portions of first leg 254d and second leg 254e of fourth-type-dual-leg coil unit 254 protruding through stator 290, e.g., by between 1-5 millimeters, such as 2-4 millimeters, or about 3 millimeters.

Figure 9A:
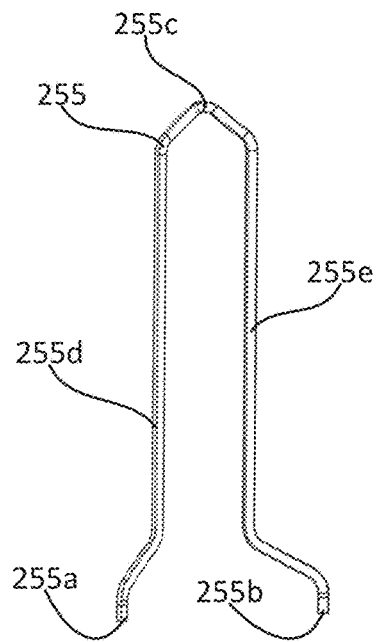
FIG. 9A is a schematic side view of another example of a dual-leg coil unit, which may be referred to as a fifth-type-dual-leg coil unit or a standard-type-two coil unit/hairpin.
Figure 9B:
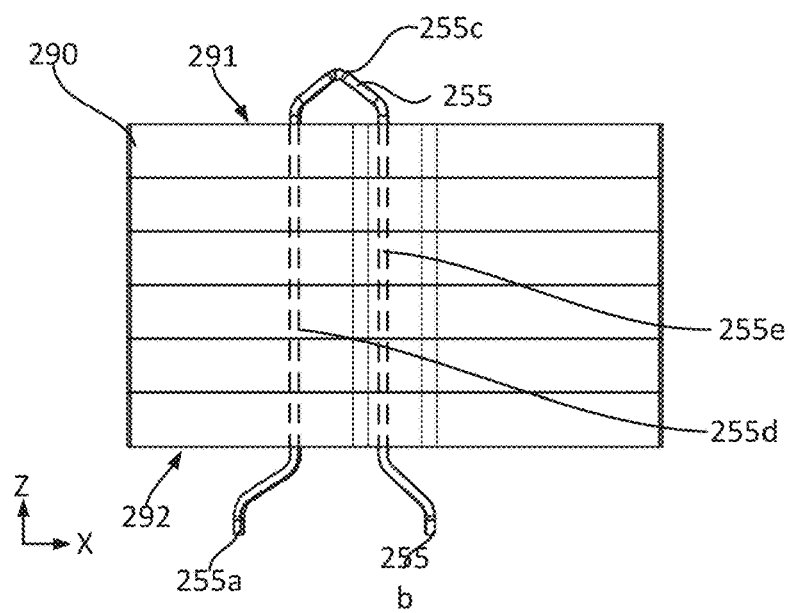
FIG. 9B is a schematic side view of the dual-leg coil unit in FIG. 9A, protruding through a stator, in accordance with some examples.
Figure 9C:
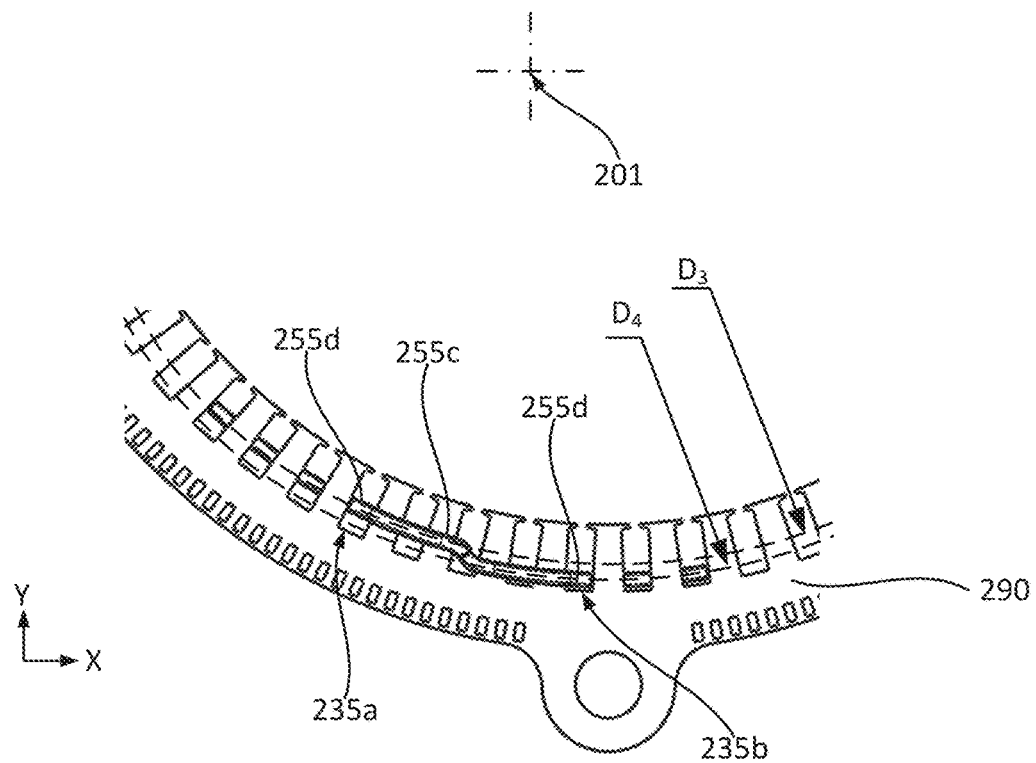
FIG. 9C is a schematic top view of the dual-leg coil unit in FIG. 9A, protruding through a stator, in accordance with some examples.

FIG. 9A is a schematic side view of another example of dual-leg coil unit 250, which may be referred to as fifth-type-dual-leg coil unit 254 or a standard-type-two coil unit/hairpin. FIGS. 9B and 9C are schematic views of fifth-type-dual-leg coil unit 254 in FIG. 9A, protruding through stator 290, in accordance with some examples. Specifically, fifth-type-dual-leg coil unit 255 comprises turn portion 255c, first leg 255d terminating with first end 255a, and second leg 255e terminating with second end 255b. Turn portion 255c, first leg 255d, and second leg 255e of fifth-type-dual-leg coil unit 255 collectively form a continuous monolithic structure. Referring to FIG. 9C, first leg 255d of fifth-type-dual-leg coil unit 255 protrudes through first fifth-type-dual-leg-coil slot 235a of plurality of stator slots 299. Second leg 255e protrudes through second fifth-type-dual-leg-coil slot 235b of plurality of stator slots 299. In this example, first fifth-type-dual-leg-coil slot 235a and second fifth-type-dual-leg-coil slot 235b are offset by 4 slots.

In some examples, (a) a portion of first leg 255d of fifth-type-dual-leg coil unit 255 protruding through stator 290 and (b) a portion of second leg 255e of fifth-type-dual-leg coil unit 255 protruding through stator 290 has different radial offsets from primary axis 201 (e.g., D3 for the protruding portion of first leg 255d vs. D4 for the protruding portion of second leg 255e). In other words, turn portion 255c of fifth-type-dual-leg coil unit 255 makes a radial "jump". This radial jump should be distinguished from the radial offset that turn portion 255c of fifth-type-dual-leg coil unit 255 can have relative to the protruding portion of first leg 255d and also relative to the protruding portion of second leg 255e.

In some examples, first end 255a of first leg 255d of fifth-type-dual-leg coil unit 255 extends from coil-interconnection side 291 and is radially offset closer to primary axis 201 than the portion of first leg 255d of fifth-type-dual-leg coil unit 255 protruding through stator 290. Furthermore, second end 255b of second leg 255e of fifth-type-dual-leg coil unit 255 extends from coil-interconnection side 291 and is radially offset closer to primary axis 201 than the portion of second leg 255e of fifth-type-dual-leg coil unit 255 protruding through stator 290. However, in some examples, turn portion 255c of fifth-type-dual-leg coil unit 255 is radially offset further away from primary axis 201 than the portions of first leg 255d and second leg 255e of fifth-type-dual-leg coil unit 255 protruding through stator 290, e.g., by between 1-5 millimeters, such as 2-4 millimeters, or about 3 millimeters.

FIG. 10A is a schematic side view of yet another example of dual-leg coil unit 250, which may be referred to as sixth-type-dual-leg coil unit 256 or a looped-type-one coil unit/hairpin. FIGS. 10B and 10C are schematic views of sixth-type-dual-leg coil unit 256, protruding through stator 290, in accordance with some examples. Specifically, sixth-type-dual-leg coil unit 256 comprises turn portion 256c, first leg 256d terminating with first end 256a, and second leg 256e terminating with second end 256b. Turn portion 256c, first leg 256d, and second leg 256e of sixth-type-dual-leg coil unit 256 collectively form a continuous monolithic structure. Referring to FIG. 10C, first leg 256d of sixth-type-dual-leg coil unit 256 protrudes through first sixth-type-dual-leg-coil slot 236a of plurality of stator slots 299. Second leg 256e protrudes through second sixth-type-dual-leg-coil slot 236b of plurality of stator slots 299. In this example, first sixth-type-dual-leg-coil slot 236a and second sixth-type-dual-leg-coil slot 236b are offset by 4 slots.

In some examples, (a) a portion of first leg 256d of sixth-type-dual-leg coil unit 256 protruding through stator 290 and (b) a portion of second leg 256e of sixth-type-dual-leg coil unit 256 protruding through stator 290 has the same radial offsets from primary axis 201 (e.g., D1 for both). In other words, turn portion 256c of sixth-type-dual-leg coil unit 256 does not make any radial "jumps" as other dual-leg coil units 250 described above.

In some examples, first end 256a of first leg 256d of sixth-type-dual-leg coil unit 256 extends from coil-interconnection side 291 and is radially offset closer to primary axis 201 than the portion of first leg 256d of sixth-type-dual-leg coil unit 256 protruding through stator 290. Furthermore, second end 256b of second leg 256e of sixth-type-dual-leg coil unit 256 extends from coil-interconnection side 291 and is radially offset closer to primary axis 201 than the portion of second leg 256e of sixth-type-dual-leg coil unit 256 protruding through stator 290. However, in some examples, turn portion 256c of sixth-type-dual-leg coil unit 256 is radially offset further away from primary axis 201 than the portions of first leg 256d and second leg 256e of sixth-type-dual-leg coil unit 256 protruding through stator 290, e.g., by between 1-5 millimeters, such as 2-4 millimeters, or about 3 millimeters.

Figure 11A:
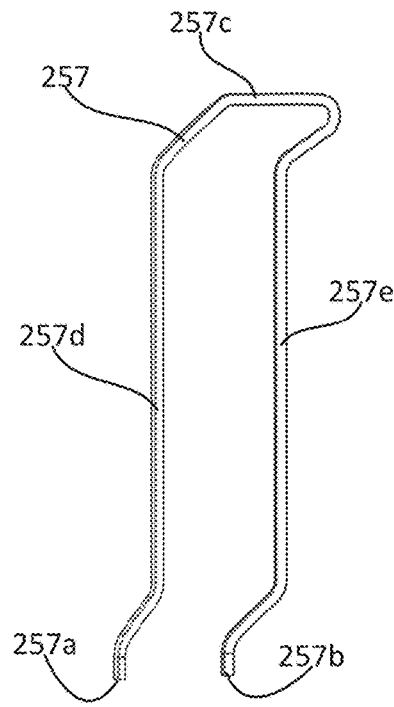
FIG. 11A is a schematic side view of a further example of a dual-leg coil unit, which may be referred to as a seventh-type-dual-leg coil unit or a looped-type-two coil unit/hairpin.
Figure 11B:
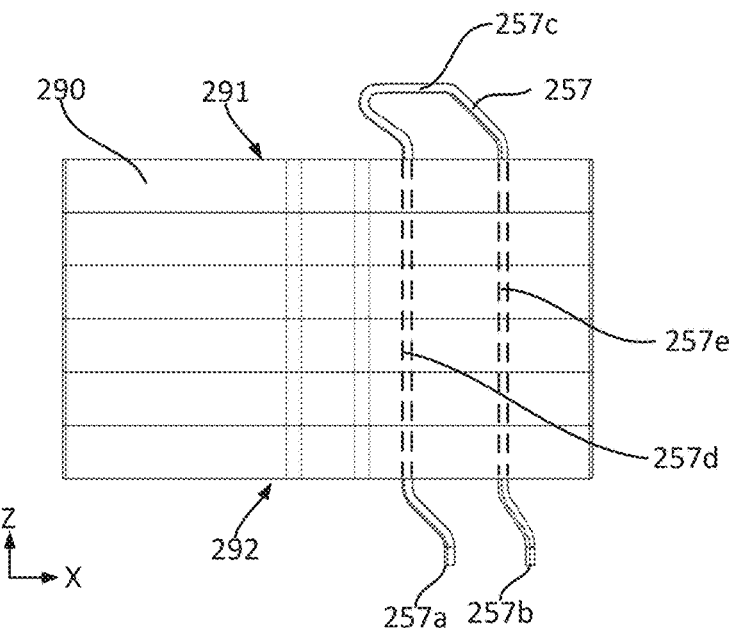
FIG. 11B is a schematic side view of the dual-leg coil unit in FIG. 11A, protruding through a stator, in accordance with some examples.
Figure 11C:
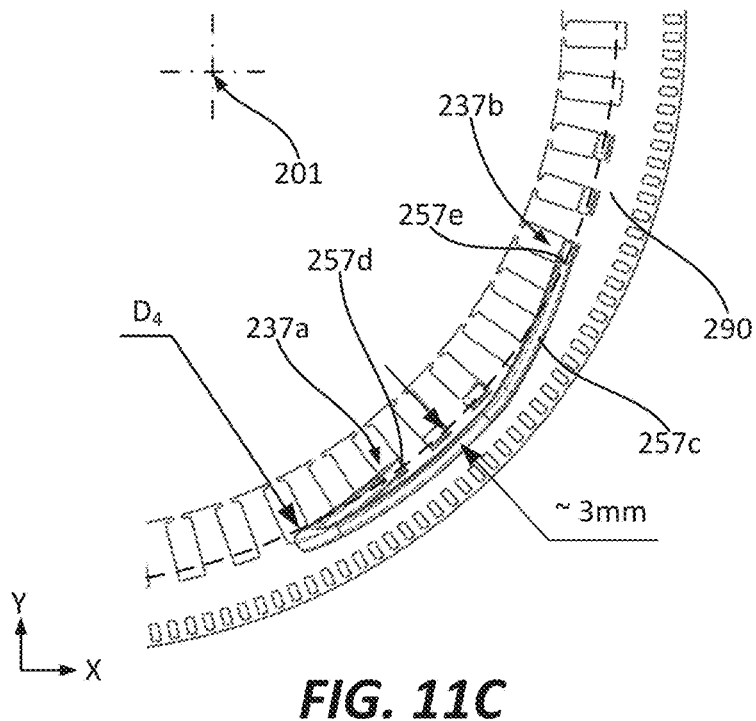
FIG. 11C is a schematic top view of the dual-leg coil unit in FIG. 11A, protruding through a stator, in accordance with some examples.

FIG. 11A is a schematic side view of a further example of dual-leg coil unit 250, which may be referred to as seventh-type-dual-leg coil unit 257 or a looped-type-two coil unit/hairpin. FIGS. 11B and 11C are schematic views of seventh-type-dual-leg coil unit 257 in FIG. 11A, protruding through stator 290, in accordance with some examples. Specifically, seventh-type-dual-leg coil unit 257 comprises turn portion 257c, first leg 257d terminating with first end 257a, and second leg 257e terminating with second end 257b. Turn portion 257c, first leg 257d, and second leg 257e of seventh-type-dual-leg coil unit 257 collectively form a continuous monolithic structure. Referring to FIG. 11C, first leg 257d of seventh-type-dual-leg coil unit 257 protrudes through first seventh-type-dual-leg-coil slot 237a of plurality of stator slots 299. Second leg 257e protrudes through second seventh-type-dual-leg-coil slot 237b of plurality of stator slots 299. In this example, first seventh-type-dual-leg-coil slot 237a and second seventh-type-dual-leg-coil slot 237b are offset by 3 slots.

In some examples, (a) a portion of first leg 257d of seventh-type-dual-leg coil unit 257 protruding through stator 290 and (b) a portion of second leg 257e of seventh-type-dual-leg coil unit 257 protruding through stator 290 has the same radial offsets from primary axis 201 (e.g., D1 for both). In other words, turn portion 257c of seventh-type-dual-leg coil unit 257 does not make any radial "jumps" as other dual-leg coil units 250 described above.

In some examples, first end 257a of first leg 257d of seventh-type-dual-leg coil unit 257 extends from coil-interconnection side 291 and is radially offset closer to primary axis 201 than the portion of first leg 257d of seventh-type-dual-leg coil unit 257 protruding through stator 290. Furthermore, second end 257b of second leg 257e of seventh-type-dual-leg coil unit 257 extends from coil-interconnection side 291 and is radially offset closer to primary axis 201 than the portion of second leg 257e of seventh-type-dual-leg coil unit 257 protruding through stator 290. However, in some examples, turn portion 257c of seventh-type-dual-leg coil unit 257 is radially offset further away from primary axis 201 than the portions of first leg 257d and second leg 257e of seventh-type-dual-leg coil unit 257 protruding through stator 290, e.g., by between 1-5 millimeters, such as 2-4 millimeters, or about 3 millimeters.

Examples of Single-Leg Coil Units

FIG. 12A is a schematic side view of one example of single-leg coil unit 260, which may be referred to as first-type-single-leg coil unit 261 or an extended-type-one coil unit/hairpin. FIGS. 12B and 12C are schematic views of first-type-single-leg coil unit 261 in FIG. 12A, protruding through stator 290, in accordance with some examples. First-type-single-leg coil unit 261 comprises first end 261a, second end 261c, and leg 261b, interconnecting first end 261a and second end 261c. A portion of leg 261b protrudes through first-single-leg-protruding slot 241b of plurality of stator slots 299. First end 261a of first-type-single-leg coil unit 261 of single-leg coil units 260 is aligned over first-end-first-single-leg-coil slot 241a of plurality of stator slots 299 such that first-end-first-single-leg-coil slot 241a is offset by two slots from first-single-leg-protruding slot 241b.

In some examples, first end 261a of first-type-single-leg coil unit 261 of single-leg coil units 260 extends from coil-interconnection side 291 and is radially offset closer to primary axis 201 than the portion of leg 261b protruding through first-type-single-leg-protruding slot 241b of plurality of stator slots 299. In the same or other examples, second end 261c of first-type-single-leg coil unit 261 of single-leg coil units 260 extends from bus-bar side 292 and is radially offset further from primary axis 201 than portion of leg 261b protruding through first-single-leg-protruding slot 262b of plurality of stator slots 299.

FIG. 13A is a schematic side view of another example of single-leg coil unit 260, which may be referred to as second-type-single-leg coil unit 262 or an extended-type-two coil unit/hairpin. FIGS. 13B and 13C are schematic side views of second-type-single-leg coil unit 262 in FIG. 13A, protruding through stator 290, in accordance with some examples. Second-type-single-leg coil unit 262 comprises first end 262a, second end 262c, and leg 262b, interconnecting first end 262a and second end 262c. A portion of leg 262b protrudes through first-single-leg-protruding slot 242b of plurality of stator slots 299. First end 262a of second-type-single-leg coil unit 262 of single-leg coil units 260 is aligned over first-end-first-single-leg-coil slot 242a of plurality of stator slots 299 such that first-end-first-single-leg-coil slot 242a is offset by two slots from first-single-leg-protruding slot 242b.

In some examples, first end 262a of second-type-single-leg coil unit 262 of single-leg coil units 260 extends from coil-interconnection side 291 and is radially offset closer to primary axis 201 than the portion of leg 262b protruding through second-type-single-leg-protruding slot 242b of plurality of stator slots 299. In the same or other examples, second end 262c of second-type-single-leg coil unit 262 of single-leg coil units 260 extends from bus-bar side 292 and is radially offset further from primary axis 201 than portion of leg 262b protruding through first-single-leg-protruding slot 262b of plurality of stator slots 299.

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A fractional-slot-winding motor having a primary axis, the fractional-slot-winding motor comprising:
   a stator, comprising a coil-interconnection side, a bus-bar side, a plurality of stator slots, and a plurality of fluid-passage slots, wherein:
      the plurality of stator slots extends through the stator parallel to the primary axis between the coil-interconnection side and the bus-bar side such that stator slots in the plurality of stator slots are circumferentially offset from each other,
      the plurality of fluid-passage slots extends through the stator between the coil-interconnection side and the bus-bar side such that fluid-passage slots in the plurality of fluid-passage slots are circumferentially offset from each other, and
      the plurality of fluid-passage slots is configured to provide a fluid flow between the coil-interconnection side and the bus-bar side;
   a bus-bar assembly, comprising a first bus bar, a second bus bar, and a third bus bar, positioned adjacent to the bus-bar side of the stator; and
   a plurality of coil units, each extending through the stator, wherein:
      each of the plurality of coil units is electrically coupled to at least one other of the plurality of coil units at the coil-interconnection side,
      a first one of the plurality of coil units is electrically coupled to the first bus bar,
      a second one of the plurality of coil units is electrically coupled to the second bus bar, a third one of the plurality of coil units is electrically coupled to the third bus bar, and an end of each of the plurality of coil units extending from the coil-interconnection side is radially offset closer to the primary axis than a portion of that one of the plurality of coil units protruding through the stator.

2. The fractional-slot-winding motor of claim 1, wherein the bus-bar assembly further comprises a neutral bulbar, electrically coupled to three of the plurality of coil units.

3. The fractional-slot-winding motor of claim 1, wherein the bus-bar assembly has a circumferential span of less than 90 degrees.

4. The fractional-slot-winding motor of claim 1, wherein four different ones of the plurality of coil units protrude through each of the plurality of stator slots.

5. The fractional-slot-winding motor of claim 1, wherein the plurality of stator slots comprises 63 stator slots.

6. The fractional-slot-winding motor of claim 5, wherein the plurality of coil units forms 14 electric poles in the fractional-slot-winding motor.

7. The fractional-slot-winding motor of claim 1, wherein the plurality of stator slots and the plurality of coil units are arranged into a 1.5 slots per pole per phase configuration.

8. The fractional-slot-winding motor of claim 1, wherein the plurality of stator slots and the plurality of coil units are arranged to provide one parallel current path for each of three phases.

9. The fractional-slot-winding motor of claim 1, wherein each of the plurality of fluid-passage slots has a greater radial offset from a primary motor axis than each of the plurality of stator slots.

10. The fractional-slot-winding motor of claim 1, wherein:
the plurality of coil units comprises dual-leg coil units and single-leg coil units,
the dual-leg coil units are only connected at the coil-interconnection side of the stator, and
the single-leg coil units are connected at both the coil-interconnection side and the bus-bar side of the stator.

11. The fractional-slot-winding motor of claim 10, wherein:
a first-type-single-leg coil unit of the single-leg coil units comprises a first end, a second end, and a leg, interconnecting the first end and the second end,
a portion of the leg protrudes through a first-single-leg-protruding slot of the plurality of stator slots, and
the first end of the first-type-single-leg coil unit of the single-leg coil units is aligned over a first-end-first-single-leg-coil slot of the plurality of stator slots such that the first-end-first-single-leg-coil slot is offset by two slots from the first-single-leg-protruding slot.

12. The fractional-slot-winding motor of claim 11, wherein the first end of the first-type-single-leg coil unit of the single-leg coil units extends from the coil-interconnection side and is radially offset closer to the primary axis than the portion of the leg protruding through the first-single-leg-protruding slot of the plurality of stator slots.

13. The fractional-slot-winding motor of claim 11, wherein the second end of the first-type-single-leg coil unit of the single-leg coil units extends from the bus-bar side and is radially offset further from the primary axis than the portion of the leg protruding through the first-single-leg-protruding slot of the plurality of stator slots.

14. The fractional-slot-winding motor of claim 10, wherein:

the dual-leg coil units comprise a first-type-dual-leg coil unit comprising a turn portion, a first leg terminating with a first end, and a second leg terminating with a second end,
the turn portion, the first leg, and the second leg of the first-type-dual-leg coil unit collectively form a continuous monolithic structure,
the first leg of the first-type-dual-leg coil unit protrudes through a first first-type-dual-leg-coil slot of the plurality of stator slots,
the second leg protrudes through a second first-type-dual-leg-coil slot of the plurality of stator slots, and
the first first-type-dual-leg-coil slot and the second first-type-dual-leg-coil slot are offset by 4 slots.

15. The fractional-slot-winding motor of claim 14, wherein (a) a portion of the first leg of the first-type-dual-leg coil unit protruding through the stator and (b) a portion of the second leg of the first-type-dual-leg coil unit protruding through the stator have different radial offsets from the primary axis.

16. The fractional-slot-winding motor of claim 15, wherein:
the first end of the first leg of the first-type-dual-leg coil unit extends from the coil-interconnection side and is radially offset closer to the primary axis than the portion of the first leg of the first-type-dual-leg coil unit protruding through the stator, and
the second end of the second leg of the first-type-dual-leg coil unit extends from the coil-interconnection side and is radially offset closer to the primary axis than the portion of the second leg of the first-type-dual-leg coil unit protruding through the stator.

17. A fractional-slot-winding motor having a primary axis, the fractional-slot-winding motor comprising:
a stator, comprising a coil-interconnection side, a bus-bar side, a plurality of stator slots, and a plurality of fluid-passage slots, wherein:
the plurality of stator slots extends through the stator parallel to the primary axis between the coil-interconnection side and the bus-bar side such that stator slots in the plurality of stator slots are circumferentially offset from each other,
the plurality of fluid-passage slots extending through the stator between the coil-interconnection side and the bus-bar side such that fluid-passage slots in the plurality of fluid-passage slots are circumferentially offset from each other, and
the plurality of fluid-passage slots is configured to provide a fluid flow between the coil-interconnection side and the bus-bar side;
a bus-bar assembly, comprising a first bus bar, a second bus bar, and a third bus bar, adjacent to the bus-bar side of the stator; and
a plurality of coil units, each extending through the stator, wherein:
each of the plurality of coil units is electrically coupled to at least one other of the plurality of coil units at the coil-interconnection side,
a first one of the plurality of coil units is electrically coupled to the first bus bar,
a second one of the plurality of coil units is electrically coupled to the second bus bar,
a third one of the plurality of coil units is electrically coupled to the third bus bar,
the plurality of coil units comprises dual-leg coil units and single-leg coil units, the dual-leg coil units are only connected at the coil-interconnection side of the stator, the single-leg coil units are connected at both the coil-interconnection side and the bus-bar side of the stator, and an end of each of the single-leg coil units extending from the bus-bar side is radially offset further away from the primary axis than a portion of that one of the single-leg coil units protruding through the stator.

18. A powertrain assembly comprising:

a gearbox; and a fractional-slot-winding motor having a primary axis and comprising a stator, a bus-bar assembly, and a plurality of coil units each extending through the stator, wherein:

the stator comprises a coil-interconnection side, a bus-bar side, a plurality of stator slots, and a plurality of fluid-passage slots;

the plurality of stator slots extends through the stator parallel to the primary axis between the coil-interconnection side and the bus-bar side such that stator slots in the plurality of stator slots are circumferentially offset from each other, the plurality of fluid-passage slots extends through the stator between the coil-interconnection side and the bus-bar side such that fluid-passage slots in the plurality of fluid-passage slots are circumferentially offset from each other, the plurality of fluid-passage slots is configured to provide a fluid flow between the coil-interconnection side and the bus-bar side, the bus-bar assembly comprises a first bus bar, a second bus bar, and a third bus bar, adjacent to the bus-bar side of the stator, each of the plurality of coil units is electrically coupled to at least one other of the plurality of coil units at the coil-interconnection side, a first one of the plurality of coil units is electrically coupled to the first bus bar, a second one of the plurality of coil units is electrically coupled to the second bus bar, a third one of the plurality of coil units is electrically coupled to the third bus bar, and an end of each of the plurality of coil units extending from the coil-interconnection side is radially offset closer to the primary axis than a portion of that one of the plurality of coil units protruding through the stator.

19. An electric vehicle comprising:

a frame; and a powertrain assembly, attached to the frame and comprising a gearbox and a fractional-slot-winding motor, wherein:

the fractional-slot-winding motor has a primary axis and comprises a stator, a bus-bar assembly, and a plurality of coil units each extending through the stator, the stator comprises a coil-interconnection side, a bus-bar side, a plurality of stator slots, and a plurality of fluid-passage slots, the plurality of stator slots extends through the stator parallel to the primary axis between the coil-interconnection side and the bus-bar side such that stator slots in the plurality of stator slots are circumferentially offset from each other, the plurality of fluid-passage slots extends through the stator between the coil-interconnection side and the bus-bar side such that fluid-passage slots in the plurality of fluid-passage slots are circumferentially offset from each other, the plurality of fluid-passage slots is configured to provide a fluid flow between the coil-interconnection side and the bus-bar side, the bus-bar assembly comprises a first bus bar, a second bus bar, and a third bus bar, adjacent to the bus-bar side of the stator, each of the plurality of coil units is electrically coupled to at least one other of the plurality of coil units at the coil-interconnection side, a first one of the plurality of coil units is electrically coupled to the first bus bar, a second one of the plurality of coil units is electrically coupled to the second bus bar, a third one of the plurality of coil units is electrically coupled to the third bus bar, and an end of each of the plurality of coil units extending from the coil-interconnection side is radially offset closer to the primary axis than a portion of that one of the plurality of coil units protruding through the stator.

20. A fractional-slot-winding motor having a primary axis, the fractional-slot-winding motor comprising:

a stator, comprising a coil-interconnection side, a bus-bar side, a plurality of stator slots, and a plurality of fluid-passage slots, wherein:

the plurality of stator slots extends through the stator parallel to the primary axis between the coil-interconnection side and the bus-bar side such that stator slots in the plurality of stator slots are circumferentially offset from each other, the plurality of fluid-passage slots extends through the stator between the coil-interconnection side and the bus-bar side such that fluid-passage slots in the plurality of fluid-passage slots are circumferentially offset from each other, and the plurality of fluid-passage slots is configured to provide a fluid flow between the coil-interconnection side and the bus-bar side;

a bus-bar assembly, comprising a first bus bar, a second bus bar, and a third bus bar, adjacent to the bus-bar side of the stator; and a plurality of coil units, each extending through the stator, wherein:

each of the plurality of coil units is electrically coupled to at least one other of the plurality of coil units at the coil-interconnection side, a first one of the plurality of coil units is electrically coupled to the first bus bar, a second one of the plurality of coil units is electrically coupled to the second bus bar, a third one of the plurality of coil units is electrically coupled to the third bus bar, the plurality of coil units comprises dual-leg coil units and single-leg coil units, the dual-leg coil units are only connected at the coil-interconnection side of the stator, the single-leg coil units are connected at both the coil-interconnection side and the bus-bar side of the stator, the dual-leg coil units comprise a first-type-dual-leg coil unit comprising a turn portion, a first leg terminating with a first end, and a second leg terminating with a second end, the turn portion, the first leg, and the second leg of the first-type-dual-leg coil unit collectively form a continuous monolithic structure, the first leg of the first-type-dual-leg coil unit protrudes through a first first-type-dual-leg-coil slot of the plurality of stator slots, the second leg protrudes through a second first-type-dual-leg-coil slot of the plurality of stator slots, the first first-type-dual-leg-coil slot and the second first-type-dual-leg-coil slot are offset by 4 slots, (a) a portion of the first leg of the first-type-dual-leg coil unit protruding through the stator and (b) a portion of the second leg of the first-type-dual-leg coil unit protruding through the stator have different radial offsets from the primary axis, the first end of the first leg of the first-type-dual-leg coil unit extends from the coil-interconnection side and is radially offset closer to the primary axis than the portion of the first leg of the first-type-dual-leg coil unit protruding through the stator, and the second end of the second leg of the first-type-dual-leg coil unit extends from the coil-interconnection side and is radially offset closer to the primary axis than the portion of the second leg of the first-type-dual-leg coil unit protruding through the stator.

* * * * *